United States Patent
Park et al.

(10) Patent No.: US 8,654,726 B2
(45) Date of Patent: Feb. 18, 2014

(54) APPARATUS FOR AVOIDING DYNAMIC INTER-CELL INTERFERENCE AND METHOD THEREOF

(75) Inventors: Sang Kyu Park, Seoul (KR); Sae Woong Bahk, Seoul (KR); Sung Guk Yoon, Seongnam-si (KR)

(73) Assignee: Seoul National University R&DB Foundation, Seoul (KR)

( * ) Notice: Subject to any disclaimer, the term of this patent is extended or adjusted under 35 U.S.C. 154(b) by 204 days.

(21) Appl. No.: 13/221,789

(22) Filed: Aug. 30, 2011

(65) Prior Publication Data
US 2012/0236800 A1    Sep. 20, 2012

(30) Foreign Application Priority Data
Mar. 16, 2011 (KR) .......................... 10-2011-0023295

(51) Int. Cl.
*H04W 4/00* (2009.01)
(52) U.S. Cl.
USPC .......... 370/329; 370/330; 455/63.1; 455/501; 455/509
(58) Field of Classification Search
None
See application file for complete search history.

(56) References Cited

U.S. PATENT DOCUMENTS

| | | | |
|---|---|---|---|
| 8,260,206 B2* | 9/2012 | Damnjanovic | 455/63.1 |
| 8,295,395 B2* | 10/2012 | Mueck et al. | 375/296 |
| 2008/0057996 A1* | 3/2008 | Sung et al. | 455/522 |
| 2010/0009705 A1* | 1/2010 | Budianu et al. | 455/501 |

* cited by examiner

*Primary Examiner* — Ian N Moore
*Assistant Examiner* — Latresa McCallum
(74) *Attorney, Agent, or Firm* — Maschoff Brennan

(57) ABSTRACT

The present invention relates to an uplink/downlink scheduling in a mobile communication system and signal transmitting/receiving scheme using the same, and more particularly a method and apparatus for a user equipment to transmit and receive signals. Each user equipment manages an interferential base station list to meet the process rate requirements. If a specific user equipment receives a first step scheduling signal including contention number information, base stations in a base station list managed by the corresponding user equipment are regarded as having real inter-cell interference links. Hence, in order for a base station having a highest priority to enable a resource assignment in a corresponding scheduling stage, a silencing signal for requesting a resource assignment prohibition is transmitted to the rest of the base stations.

12 Claims, 21 Drawing Sheets

BS-contention

ICI-link setup Criterion :
dynamic and user -
dependent

Contention on CH-1

Contention on CH-1

(a) Ratio : number of ICI-exposed UTs / number of total UTs (b) Normalized spectrum utiliaztion (c) Average throughput dof ICI-exposed UTs (d) Average cell throughput

APPARATUS FOR AVOIDING DYNAMIC INTER-CELL INTERFERENCE AND METHOD THEREOF

CROSS REFERENCE TO RELATED APPLICATIONS

This application claims the benefit of the Korean Patent Application No. 10-2011-0023295, filed on Mar. 16, 2011, which is hereby incorporated by reference as if fully set forth herein.

BACKGROUND OF THE INVENTION

1. Field of the Invention

The present invention relates to an uplink/downlink scheduling in a mobile communication system and signal transmitting/receiving scheme using the same, and more particularly, to an apparatus for avoiding dynamic inter-cell interference and method thereof. Although the present invention is suitable for a wide scope of applications, it is particularly suitable for a base station to perform scheduling to avoid inter-cell interference due to dynamic scheduling and also suitable for a user equipment to transmit/receive signals through the scheduling.

2. Discussion of the Related Art

Recently, the demand for a high data rate is considerably increasing to keep pace with a size of the rapidly increasing wireless communication. As an alternative for increasing a re-usability of a frequency resource in a wireless network environment and also raising capacity of a system, a femto cell has been in the spotlight for recent years. Unlike a macro base station that is precisely deployed by a mobile communication service provider, femto base stations trend to be distributed randomly and intensively as they are arranged or moved by users. The intensive and random distribution of the femto base stations generates inter-cell interference that eventually degrades a link quality for user equipments in the vicinity of their femto base stations as well as users situated on a cell coverage boundary. And, a considerable number of users are exposed to the inter-cell interference.

Since a femto base station basically gives an access grant to a user equipment belonging to a closed subscriber group (hereinafter abbreviated CSG) only, it is difficult for a user equipment to receive a service from a base station that provides a better link quality through handover, which accelerates the link quality degradation due to the interference in a femto cell environment. Therefore, the inter-cell interference management in the femto cell environment is more significant than that in the macro cell environment.

It may be able to overcome the performance degradation due to the inter-cell interference through a central entity. In this case, the central entity controls topology status (position informations of femto base station and user equipments) management of a whole network and controls scheduling of each femto base station. Yet, a centralized system is accompanied with a signaling delay, a cost for a central entity operation, a cost for additional resource use and the like and also has limitation put on its extensibility. Therefore, self-configuration is very important for performance enhancement of a system in a femto cell environment. And, femto base stations should perform resource assignment in dynamic consideration of peripheral environment to optimize performance of a network.

SUMMARY OF THE INVENTION

Accordingly, the present invention is directed to an apparatus for avoiding dynamic inter-cell interference and method thereof that substantially obviate one or more problems due to limitations and disadvantages of the related art.

An object of the present invention is to provide a distributive scheme, by which each base station assigns a frequency resource to a user equipment in a manner of coping with a peripheral environment dynamically and appropriately to avoid inter-base station interference. In particular, by the provided scheme, base stations cooperate with each other to guarantee a high signal to interference and nose ratio (hereinafter abbreviated SINR) for user equipments in consideration of a real-time scheduling status.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting and receiving signals in a user equipment, which considers an inter-cell interference link formed in accordance with a dynamic scheduling in a mobile communication system, according to one embodiment of the present invention includes the steps of receiving a first step scheduling signal (or a contention scheduling signal) including a user equipment specifying information and a contention number information from at least one base station, if the user equipment specifying information in the first step scheduling signal indicates the user equipment, transmitting a silencing signal for requesting not to perform a resource assignment in a corresponding scheduling stage to base stations except a base station having the user equipment belong thereto and a base station having transmitted the contention number information having a highest priority among base stations in a base station list having an inter-cell interference link applying interference over a predetermined level to the user equipment for a prescribed period, and if the base station having transmitted the contention number information having the highest priority is the base station having the user equipment belong thereto, receiving a second step scheduling signal (or a resource assignment signal) including a resource assignment information on an uplink signal transmission or a downlink signal reception from the base station having the user equipment belong thereto.

Preferably, if the user equipment specifying information in the first step scheduling signal does not indicate the user equipment, the user equipment does not transmit the silencing signal to the base station having the user equipment belong thereto or the base stations in the base station list having the inter-cell interference link.

Preferably, the user equipment updates the base station list having the inter-cell interference link in accordance with an SINR threshold reference or a processing rate of an uplink or downlink signal of the user equipment by a prescribed cycle unit.

More preferably, the user equipment enables the base stations applying the interference to the user equipment to be included in the base station list as many as the number of the base stations in the base station list determined to guarantee that the processing rate of the user equipment becomes equal to or greater than a prescribed expected value.

Preferably, the silencing signal transmitting step includes the steps of if the base station having transmitted the contention number information having the highest priority among the base station having the user equipment belong thereto and the base stations in the base station list is the base station having the user equipment belong thereto, transmitting the silencing signal to all the base stations in the base station list except the base station having the user equipment belong thereto and if the base station having transmitted the contention number information having the highest priority among the base station having the user equipment belong thereto and the base stations in the base station list is not the base station having the user equipment belong thereto, transmitting the silencing signal to the base station having the user equipment belong thereto only.

Preferably, the mobile communication system uses a frame including a downlink interval including a downlink scheduling information containing the user equipment specific information and the contention number information in $(n+1)^{th}$ scheduling stage and the resource assignment information in $n^{th}$ scheduling stage and an uplink interval including the silencing signal for a specific base station in the $(n+1)^{th}$ scheduling stage.

Preferably, the at least one base station includes a femto base station.

In another aspect of the present invention, a method of performing a scheduling in a base station, which considers an inter-cell interference link formed in accordance with a dynamic scheduling in a mobile communication system, includes the steps of transmitting a first step scheduling signal including a user equipment specifying information for specifying a specific user equipment and a contention number information to the specific user equipment and transmitting a second step scheduling signal including a resource assignment information on uplink signal reception or a downlink signal transmission by considering whether a silencing signal for requesting not to perform a resource assignment in a corresponding scheduling stage is received from at least one user equipment including the specific user equipment, wherein the silencing signal is received by a base station in a base station list having an inter-cell interference link managed by a user equipment indicated by the user equipment specifying information in the first step scheduling signal of the base station and base stations except a base station having transmitted the contention number information having a highest priority in the corresponding scheduling stage among base stations to which the user equipment indicated by the user equipment specifying information belongs thereto.

Preferably, if the specific user equipment is a user equipment belonging to the base station, the base station transmits the resource assignment information on the uplink signal reception or the downlink signal transmission to another user equipment not participating in a contention scheduling despite receiving the silencing signal from the specific user equipment and if the specific user equipment is a user equipment not belonging to the base station, the base station does not transmit the resource assignment information in case of receiving the silencing signal from the specific user equipment.

More preferably, the uplink interval is configured to specify whether the silencing signal for the specific base station is a signal transmitted by the user equipment belonging to the specific base station.

In another aspect of the present invention, a user equipment, which transmits and receives signals by considering an inter-cell interference link formed in accordance with a dynamic scheduling in a mobile communication system, includes a receiving module receiving a first step scheduling signal including a user equipment specifying information and a contention number information and a second step scheduling signal including a resource assignment information on an uplink signal transmission or a downlink signal reception at least one base station, a transmitting module transmitting a silencing signal for requesting not to perform a resource assignment in a corresponding scheduling stage to a specific base station, and a processor, if the user equipment specifying information in the first step scheduling signal indicates the user equipment, controlling the receiving module and the transmitting module to transmit the silencing signal to base stations in a base station list having an inter-cell interference link applying interference over a predetermined level to the user equipment for a prescribed period and base stations having the user equipment belong thereto except a base station having transmitted the contention number information having a highest priority.

In further aspect of the present invention, a base station, which performs a scheduling by considering an inter-cell interference link formed in accordance with a dynamic scheduling in a mobile communication system, includes a transmitting module transmitting a first step scheduling signal including a user equipment specifying information for specifying a specific user equipment and a contention number information and a second step scheduling signal including a resource assignment information on a uplink signal reception or a downlink signal transmission to the specific user equipment, a receiving module receiving a silencing signal for requesting not to perform a resource assignment in a corresponding scheduling stage from at least one user equipment including the specific user equipment, and a processor configured to control the transmitting module to transmit the second step scheduling signal by considering whether the receiving module receives the silencing signal from the at least one user equipment including the specific user equipment, wherein the silencing signal is received by a base station in a base station list having an inter-cell interference link managed by a user equipment indicated by the user equipment specifying information in the first step scheduling signal of the base station and base stations except a base station having transmitted the contention number information having a highest priority in the corresponding scheduling stage among base stations to which the user equipment indicated by the user equipment specifying information belongs thereto.

Accordingly, the present invention provides the following effects and/or advantages.

First of all, a scheme proposed through simulation enhances performance of user equipments exposed to inter-cell interference.

Secondly, the proposed scheme increases capacity of a whole network.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station is a common name of such a random node of a network stage communicating with a terminal as a Node B (NB), an eNode B (eNB), a base station (BS), an advanced base station (ABS) and the like.

In a mobile communication system, a user equipment is able to receive information from a base station in downlink (DL) and is also able to transmit information in uplink (UL). Informations transmitted or received by the user equipment include data and various kinds of control informations. And, various kinds of physical channels exist in accordance with types and usages of the informations transmitted or received by the user equipment.

In the following description, a system model, to which the present invention is applicable, and a potential inter-cell interference link and a real inter-cell interference link used by the present invention are explained. Based on this description, a scheduling in consideration of a real inter-cell interference link and a signal transmitting/receiving method using the same shall be explained in detail.

Figure 1:
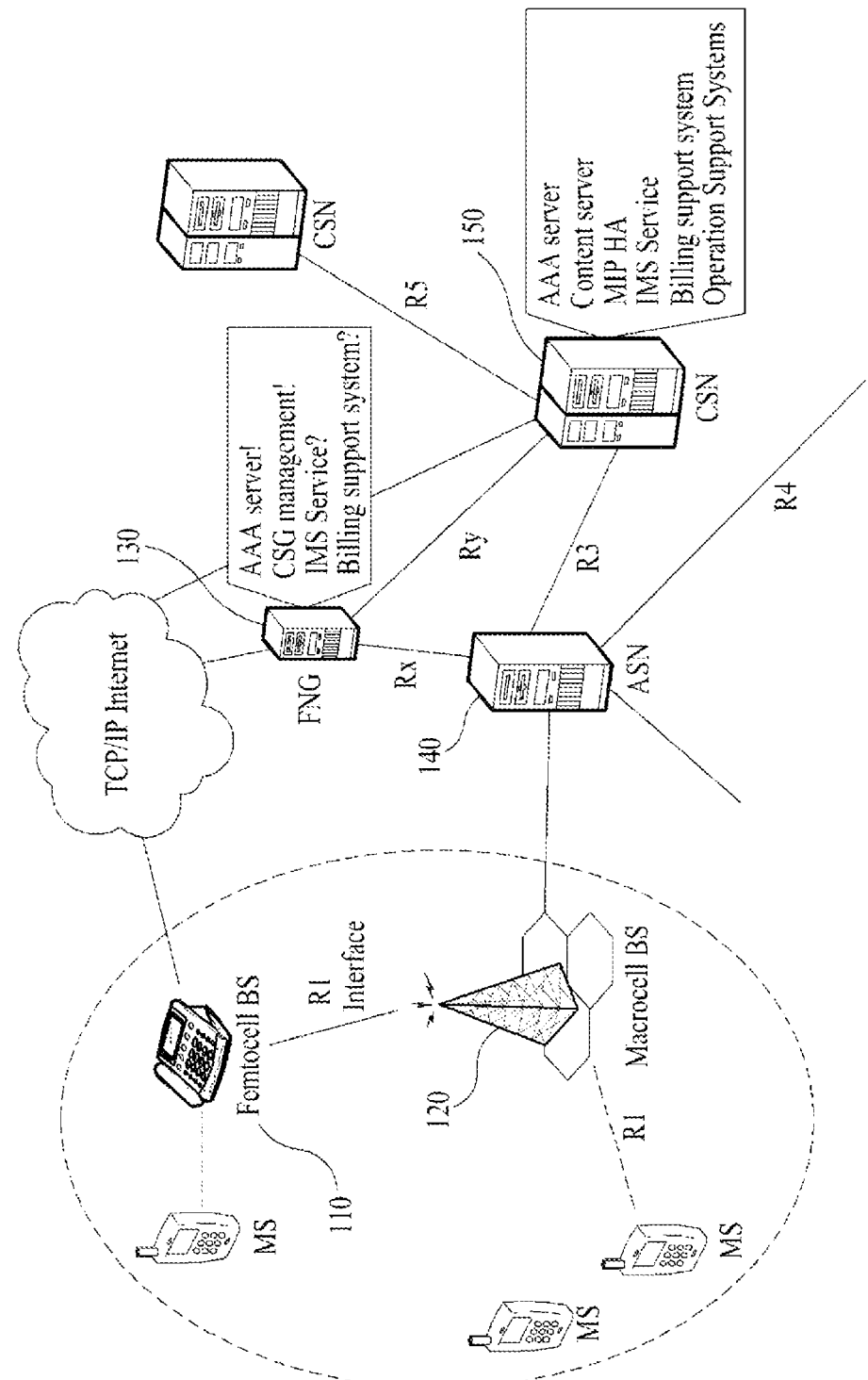
FIG. 1 is a diagram of a wireless communication system having a femto base station added thereto.

FIG. 1 is a diagram of a wireless communication system having a femto base station added thereto.

Referring to FIG. 1, a wireless communication system, to which a femto base station is added, includes a femto base station 110, a macro base station 120, a femto network gateway (hereinafter abbreviated FNG) 130, an access service network (hereinafter abbreviated ASN) 140 and a connectivity service network (hereinafter abbreviated CSN) 150. In this case, the macro base station 120 means a general base station in a wireless communication system of the related art.

The femto base station 110 is a small version of the macro base station 120 and performs most of the functions of the macro base station. The femto base station 110 directly accesses TCP/IP (transmission control protocol/internet protocol) network and operates like the base station 120 independently. A coverage of the femto base station 100 amounts to 0.1~30 m approximately and the number of user equipments (or mobile stations) covered by one femto base station 110 amounts to 10~20. The femto base station 110 uses the same frequency of the macro base station 120 or can use another frequency.

The femto base station 110 is connected to the macro base station 120 via an interface R1 and is then able to receive a DL (downlink) channel of the macro base station 120. And, the femto base station 110 is able to transmit a control signal to the macro base station 120.

The femto base station 110 is able to cover an indoor or shade zone the macro base station 120 is unable to cover. And, the femto base station 110 is able to support a high data rate. The femto base station 110 can be installed in an overlay form within macro cell or can be installed in a non-overlay form in an area that is not covered by the macro base station 120.

Femto base stations can be classified into two kinds of types. The first type corresponds to a closed subscriber group (hereinafter abbreviated CSG) femto base station. And, the second type corresponds to an open subscriber group (hereinafter abbreviated OSG) femto base station. The CSG femto base station gives CSG ID by grouping the user equipments accessible to itself. And, the user equipment having the CSG ID given thereto is able to access the CSG femto base station only. Meanwhile, the OSG femto base station is the base station to which every user equipment is accessible.

The FNG 130 is the gateway that controls the femto base station 110. The FNG 130 is connected to the ASN 140 via an interface Rx and is connected to the CSN 150 via an interface Ry. The femto base station 110 is able to receive a service from the CSN 150 via the FNG 130. And, the user equipment accessing the femto base station 110 is able to receive such a service function as authentication, IMS and the like from the FNG 130 or the CSN 150. The CSN 150 provides the user equipment with such a connection of an application service as Internet, VoIP and the like and also provides the user equipment with an authentication and billing function. The ASN 140 controls the macro base station 120 and manages the connectivity between the macro base station 120 and the CSN 150.

The inter-cell interference link is explained as follows. In the following description, a base station is assumed as the above-mentioned femto base station, which does not exclude a case that a base station is a macro base station.

Figure 2:
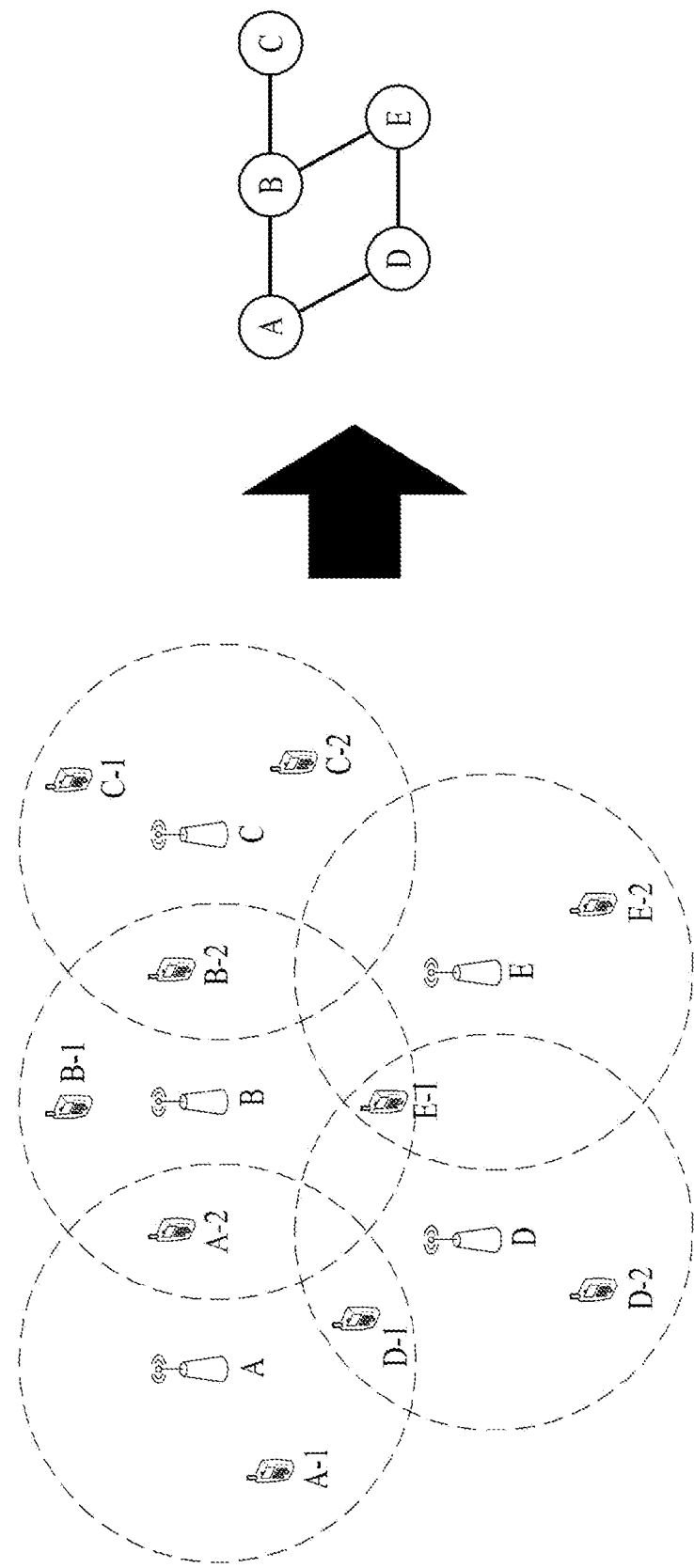
FIG. 2 is a diagram for describing the inter-cell interference link concept according to one embodiment of the present invention.

FIG. 2 is a diagram for describing the inter-cell interference link concept according to one embodiment of the present invention.

In a base station environment, in which a considerable number of user equipments are intensively distributed by being exposed to inter-cell interference, several terminologies are explained to indicate statuses of each user equipment and base station as follows.

First of all, if an SINR of a user equipment k can become lower than an SINR threshold in accordance with a resource assignment of a neighbor base station, it can be named that the user equipment k is in 'inter-cell interference-exposed state'. And, an inter-base station relation 'potential inter-cell interference link' can be determined in accordance with a presence or non-presence of a user equipment exposed to the inter-cell interference.

As both a base station of a prescribed user equipment and a neighbor base station allocate resources to the user equipment on the same channel, if a corresponding SINR obtained by the user equipment becomes lower than a threshold, it can be called that both of the base stations are connected via 'potential inter-cell interference link'.

FIG. 2 illustrates a configuration of a potential inter-cell interference link between femto base stations for positions of a given femto base station and user equipments. If a prescribed user equipment is exposed to inter-cell interference from several base stations around the user equipment, a plurality of inter-cell interference links can be generated by the corresponding user equipment.

FIG. 3 is a diagram for describing the real inter-cell interference link concept according to one embodiment of the present invention.

Figure 3A:
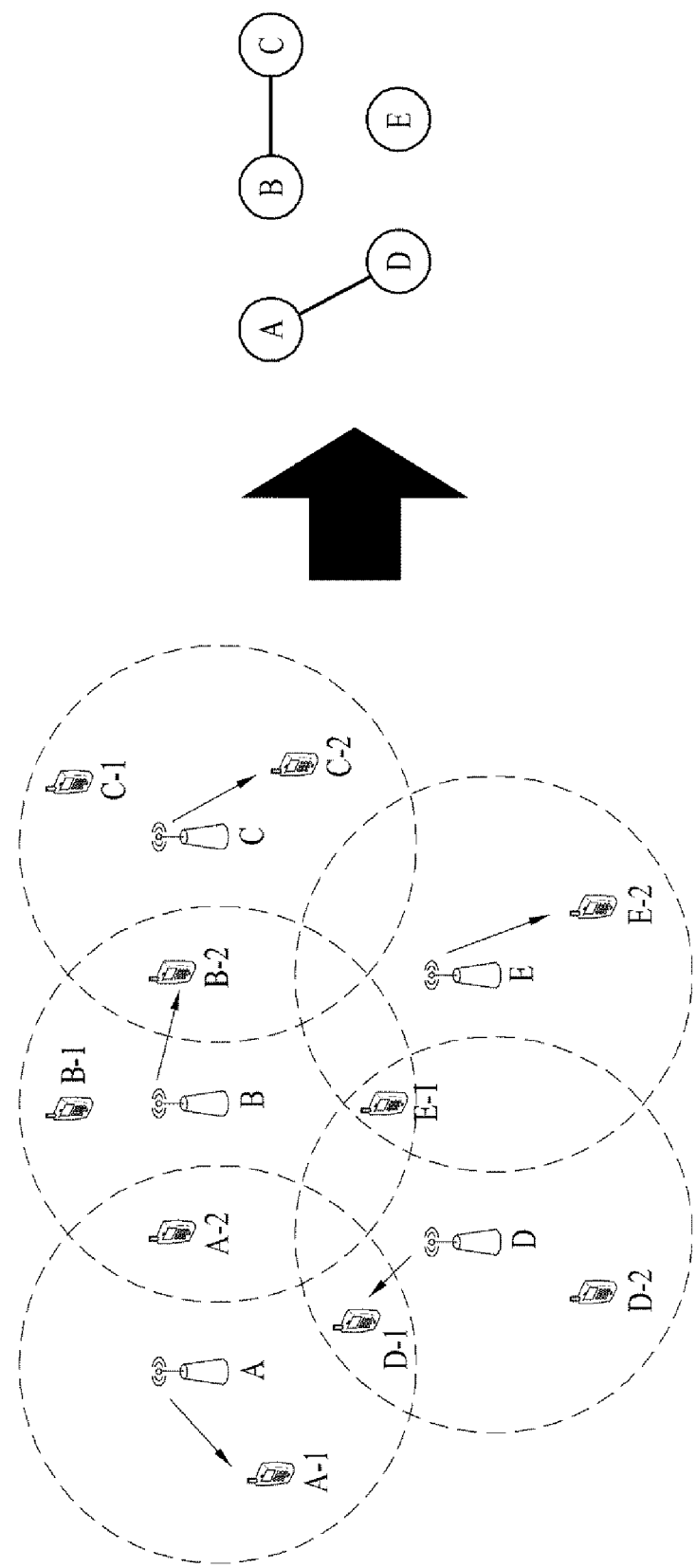
FIG. 3 is a diagram for describing the real inter-cell interference link concept according to one embodiment of the present invention.

Referring to FIG. 3, assume that a real inter-cell interference link according to one embodiment of the present invention is determined in accordance with a user equipment scheduling status of each base station. For instance, FIG. 3A shows that each of user equipments A-1, B-2, C-2, D-1 and E-2 is scheduled by a corresponding base station for a given resource assignment period (hereinafter called 'scheduling stage'). Assuming an example that the user equipment B-2 and the user equipment D-1 are exposed to the interferences from the base station C and the base station A, respectively, referring to a right part of FIG. 3A, during this resource assignment period, a real inter-cell interference link is established between the base station A and the base station D and a real inter-cell interference link is established between the base station B and the base station C.

Figure 3B:
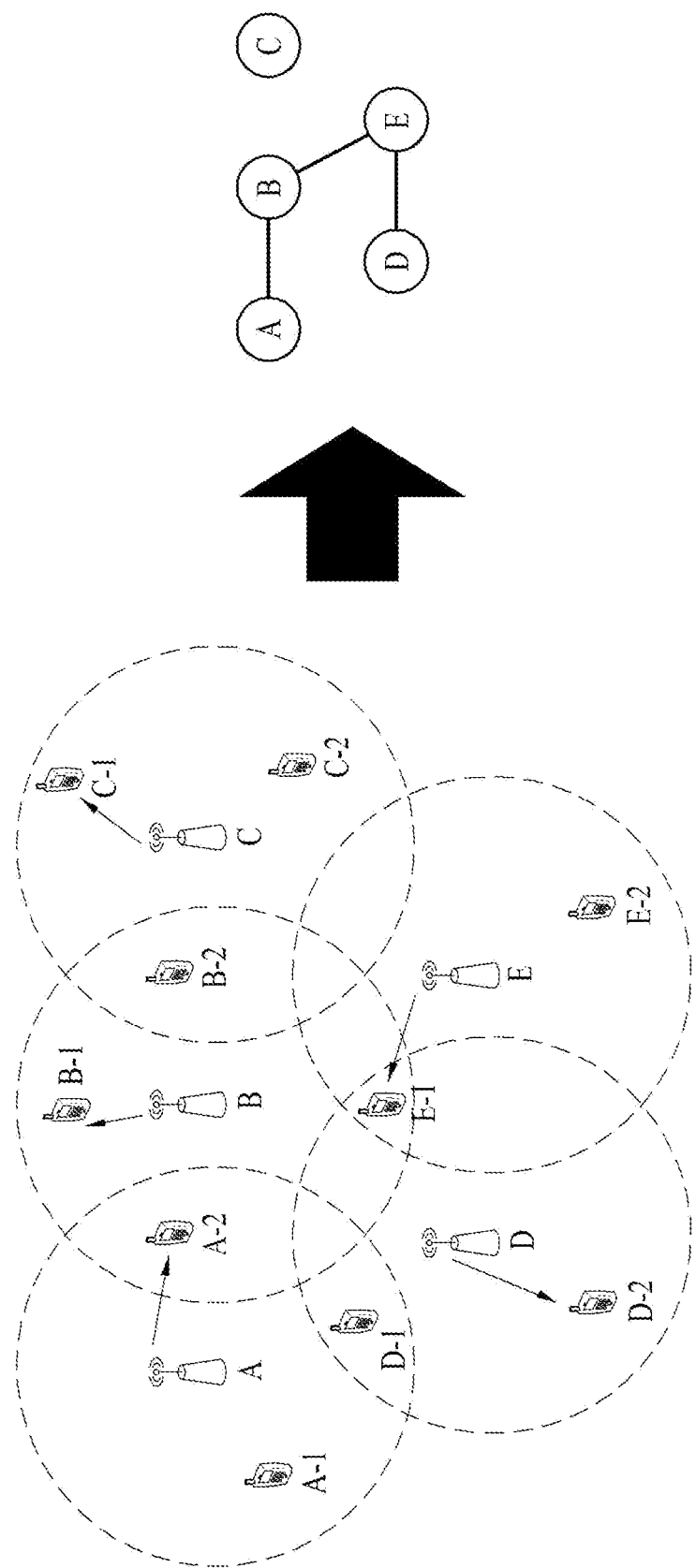

FIG. 3B shows an example of a real inter-cell interference link in another scheduling stage. In particular, when the base stations A to E allocate resources to user equipments A-2, B-1, C-1, D-2 and E-1, respectively, in case that the user equipment A-2 and the user equipment E-1 are exposed to the interference from the base station B and the interference from the base stations B and D, respectively, the real inter-cell interference links can be established as shown in the right part of FIG. 3B.

In particular, after the user equipment scheduling of the base stations has been determined, if an SINR of a user equipment having a resource assigned thereto by a corresponding base station becomes a threshold of the SINR due to an interference signal from a neighbor base station, both of the two base stations are regarded as connected together via 'real inter-cell interference link'. In brief, assume that the 'potential inter-cell interference link' is determined in accordance with a deployed state of femto base stations and user equipments. And, assume that the 'real inter-cell interference link' is determined in accordance with a scheduling status of each base station on a potential inter-cell interference link.

In the following description, a scheduling method for interference avoidance proposed according to the present invention is explained using the above-mentioned concept. For this, a contention based scheduling scheme is described in the first place as follows.

First of all, according to the above-mentioned inter-cell interference link model, when two femto base stations are connected together via an inter-cell interference link, one of the two base stations is able to allocate a channel resource to its user equipment only. Otherwise, a user equipment exposed to the inter-cell interference receives data at a very low data rate due to a low SINR or may not be able to receive any data. As long as the user equipment A-2 is exposed to an interference signal from the femto base station B, as shown in FIG. 2 or FIG. 3, it acquires a low data rate from the base station A due to a low SINR. Hence, assuming that a same quantity of channel resource is distributed to the user equipment A-1 and the user equipment A-2 without considering a data rate requested by a corresponding user equipment, the user equipment A-2 receives data at a data rate considerably lower than that of the user equipment A-1. Assuming that resources are distributed in consideration of a data rate requested by a user equipment, if the requested data rate of the user equipment A-1 is equal to that of the user equipment A-2, a larger quantity of the channel resource will be assigned to the user equipment A-2, thereby reducing total cell capacity.

In order to avoid the performance degradation due to the inter-cell interference, femto base stations connected to each other via inter-cell interference link should cooperate with each other. In order to perform transmission to a user equipment exposed to inter-cell interference at a guaranteed SINR, it is preferable that only one of the base stations connected to together via the inter-cell interference link uses a channel resource for a given resource assignment period. For this, the present invention proposes to use 'contention based channel scheduling scheme' between base stations. This relates to inter-base station contention regarding the relation with a specific user equipment. And, special attention needs to be paid to the fact that the inter-base station contention is conceptionally discerned from inter-user equipment contention used by MAC of IEEE 802.11 based system.

Figure 4:
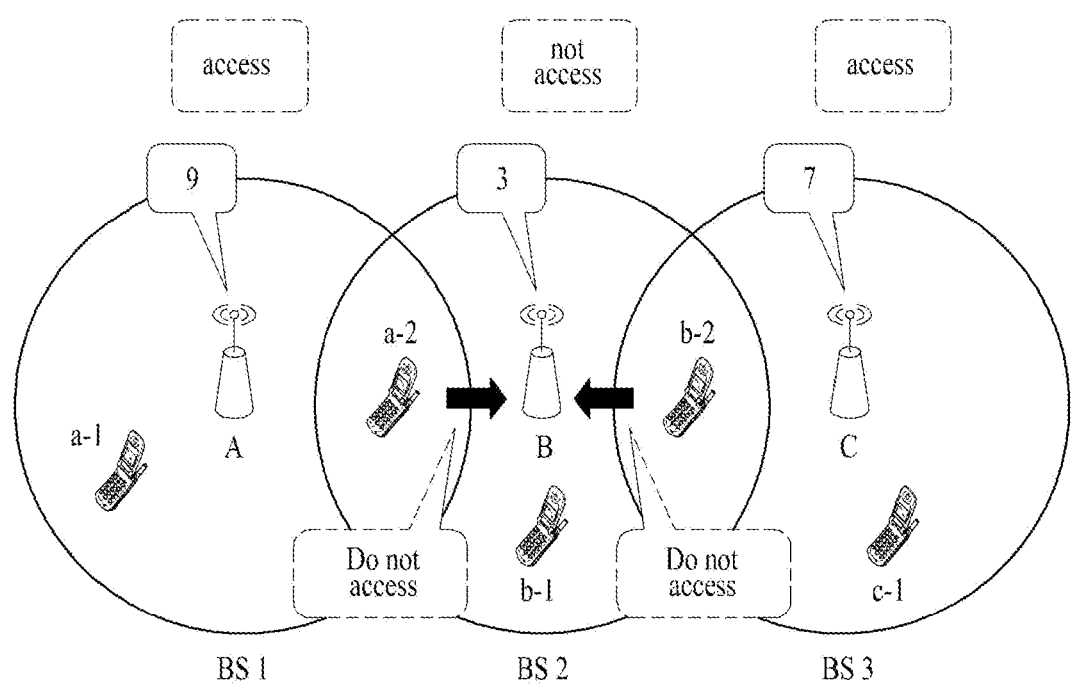
FIG. 4 is a diagram for describing an operation of a base station contention based scheduling scheme.

Operations of the base station contention based scheduling scheme are briefly described with reference to FIG. 4 as follows.

(1) Each base station selects a random contention number within a contention window and then broadcasts the selected number to be heard by all user equipments situated within coverage. FIG. 4 shows an example that base stations A to C select contention numbers 9, 3 and 7, respectively and then broadcast the selected numbers to user equipments.

(2) Each user equipment hears the contention numbers broadcasted by a base station connected to the corresponding user equipment and neighbor base stations and is then able to transmit a loser signal or a silencing signal to all the base stations, each of which has transmitted the contention number smaller than a contention number (e.g., a biggest number) having a highest priority, around the corresponding user equipment. In this case, the silencing number indicates a signal for requesting not to perform scheduling during a corresponding scheduling stage. Referring to FIG. 4, the user equipment a-2 regards the base station A having transmitted the contention number 9 as beating the base station B having transmitted the contention number 3 in the contention and then transmits a silencing signal to the base station B. Likewise, the user equipment b-2 transmits a silencing signal to the base station B having lost at the contention.

(3) A base station having selected a biggest contention number is able to exclusively occupy and use a channel during a next resource assignment period. For example, referring to FIG. 4, while the base station B does not perform the scheduling, the base station A is able to exclusively use a corresponding scheduling stage. Likewise, the base station C is able to perform resource assignment using a corresponding scheduling stage exclusively while the base station B does not perform the scheduling.

The above-mentioned mechanism has the following advantages.

First of all, if a user equipment is located in an area in which coverages of at least two base stations overlap with each other, it is allowed to use a channel resource of one of the base stations only. Hence, it is able to avoid inter-cell interference by a distributive scheme.

Secondly, base stations participating in the contention fairly share a channel resource in aspect of time.

Yet, regarding the above-mentioned base station contention based scheduling scheme, if base stations are in contention without considering a scheduling status (i.e., contention in consideration of the above-mentioned potential inter-cell interference link only), a reuse rate of a frequency resource may be unnecessarily lowered due to the unnecessary contention. Therefore, one preferred embodiment of the present invention proposes a setup for enabling base stations to be in contention based on a real inter-cell interference link according to a user equipment scheduling status. Since the real inter-cell interference based inter-base station contention enables the number of inter-cell interference links to be smaller than that of each contention step, spatial reusability of frequency is raised. According to the proposed scheme, a user equipment sets base stations to the minimum as interferential base stations with reference to its target SINR and then transmits a silencing signal (i.e., a contention result) to the interferential base stations selectively, whereby the reusability of frequency can be raised.

Figure 5:
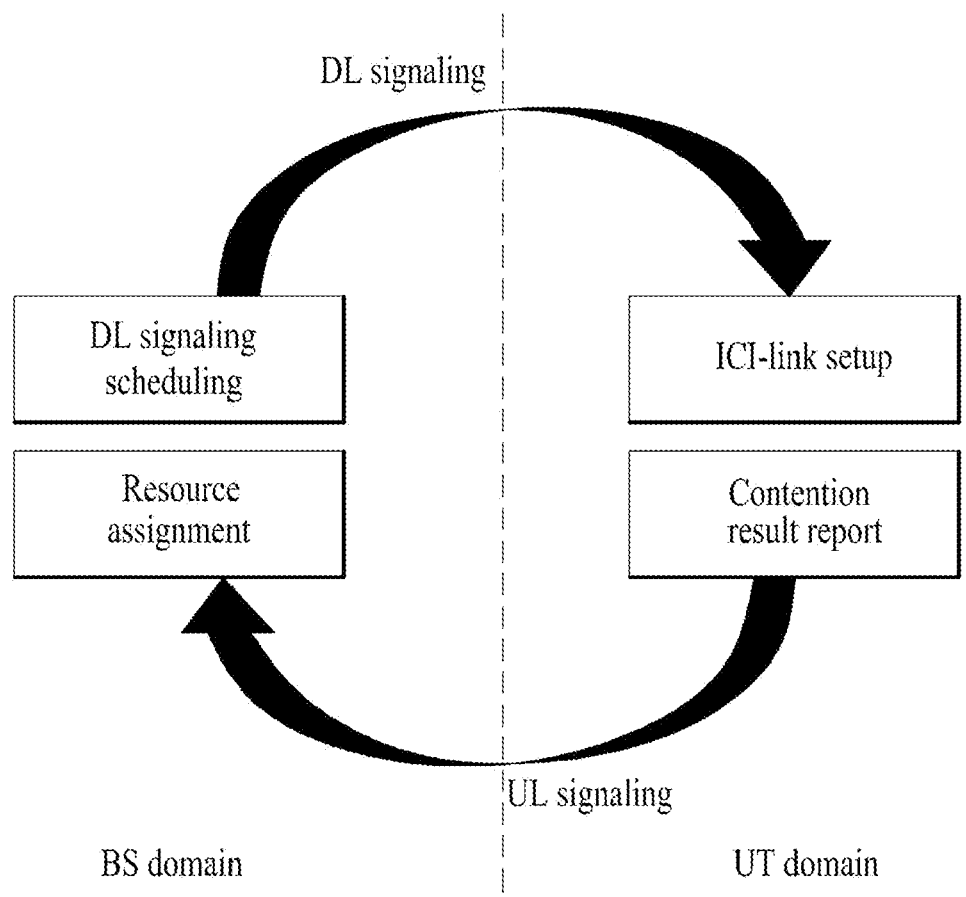
FIG. 5 is a conceptional diagram for describing a 2-step scheduling scheme according to one preferred embodiment of the present invention.

FIG. 5 is a conceptional diagram for describing a 2-step scheduling scheme according to one preferred embodiment of the present invention.

Referring to FIG. 5, a frequency resource scheduling process according to one preferred embodiment of the present invention can be divided into two steps including a contention scheduling and a resource assignment.

1) Contention Scheduling

In this step, femto base stations are able to make two kinds of decisions including a user equipment selection and a contention number selection. Each base station selects one user equipment according to its scheduling policy and then participates in contention with other base stations to allocate a channel resource to the selected user equipment in a next resource assignment period. In particular, a real inter-cell interference link is determined in accordance with a user equipment selection made by each femto base station.

When a prescribed femto base station is connected to a different femto base station via an inter-cell interference link, if the prescribed femto base station loses a contention, since the prescribed femto base station should give up a channel for the different base station during a next resource assignment period, the prescribed base station is unable to allocate a channel resource to a contention scheduled user equipment. Therefore, in the contention scheduling step, each base station is unable to know whether a channel can be assigned to a selected user equipment in a next resource assignment period.

Each base station selects a user equipment, to which a channel will be assigned in a next resource assignment period, and is also able to select a contention number which will be used in a contention with base stations connected via inter-cell interference links. The base stations connected via the inter-cell interference links have contention results in accordance with the selected contention numbers, respectively. Each femto base station is able to select a contention number (or a contention window size) in consideration of a traffic load, a traffic type, a QoS request level of a contention scheduled user equipment and the like in accordance with a resource assignment policy of each base station.

2) UE-Based ICI-Link (Inter-Cell Interference-Link) Setup

Each user equipment has a list of potential interferential base stations (i.e., base stations connected to a base station of the corresponding user equipment via potential inter-cell interference links) and updates the list periodically (e.g., per several milli-seconds) to adapt to a location change of a femto base station or a user equipment. In each list update cycle, if a power strength of a preamble received from a neighbor base station is higher than an interference threshold, a user equipment sets the corresponding base station as a potential interferential base station (and/or by considering an expected processing rate).

According to the present embodiment, a real inter-cell interference link between base stations is determined by contention-scheduled user equipments. In particular, according to the present embodiment, if a prescribed user equipment is contention-scheduled by its base station, a potential inter-cell interference link generated by the corresponding user equipment becomes a real inter-cell interference link and each of the contention-scheduled user equipments is able to report the corresponding contention result to its base station and interferential base stations only.

3) Contention Result Report

A contention-scheduled user equipment compares a contention number generated by its base station to contention numbers generated by interferential base stations. If the contention number generated by the base station of the contention-scheduled user equipment is the biggest, the contention-scheduled user equipment sends a silencing signal to all interferential base stations to prevent them from using a channel. On the contrary, if a prescribed one of the interferential base stations generates the contention number bigger than the contention number generated by the base station of the contention-scheduled user equipment, the contention-scheduled user equipment sends a silencing signal to its base station to indicate that a corresponding channel should be given up for another base station. In doing so, the contention-scheduled user equipment does not send a silencing signal to the interferential base stations having selected the contention numbers each of which is smaller than the number of the base station (to which the contention-scheduled user equipment belongs), whereby spatial reusability of a channel resource can be enhanced.

4) Resource Assignment

Having received the contention result reports from user equipments around, a base station can be aware of a contention result in each inter-cell interference link. If a prescribed base station receives a silencing signal at least, the prescribed base station gives up a channel use right of a next resource assignment period for a winning base station. On the contrary, if a prescribed base station does not receive any silencing signal at all, it means that the prescribed base station has selected a contention number bigger than that of every base station connected via inter-cell interference link and wins the contention. Therefore, each base station failing to receive the silencing signal has the right of assigning a channel resource to user equipments selected by the corresponding base station in the contention scheduling step. As the contention result is the result attributed to the real inter-cell interference link set up by the contention-scheduled user equipments, even if the base station winds the contention, the corresponding base station should assign resource to the contention-scheduled user equipments only.

Figure 6:
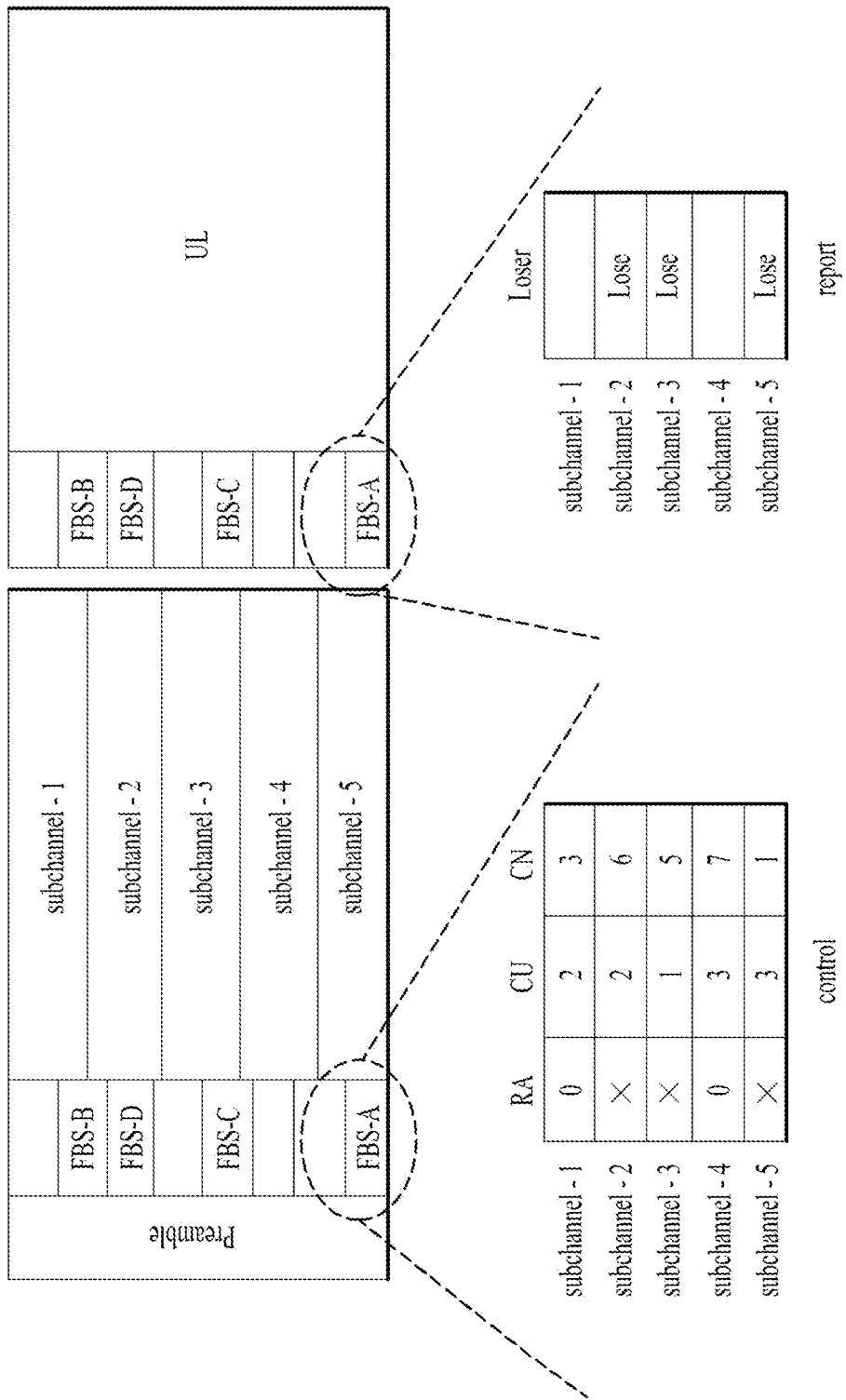
FIG. 6 is a diagram of a frame structure to which a scheduling method according to one preferred embodiment of the present invention is applicable.

FIG. 6 is a diagram of a frame structure to which a scheduling method according to one preferred embodiment of the present invention is applicable.

In order to deliver necessary control information to user equipments reliably, each base station is able to use a corresponding dedicated control channel. A femto base station is able to use a vacant control channel, which avoids colliding with controls channels of other femto base station on being turned on, as its dedicated channel. Control information of the femto base station can include resource assignment information and contention scheduling information, which can be transmitted via a downlink interval named 'control' in the frame structure shown in FIG. 6.

In FIG. 6, RA (resource assigned) field indicates whether a subchannel corresponding to a present resource assignment period will be assigned to a user equipment contention-scheduled in a previous step. Referring to FIG. 6, a base station A assigns a subchannel-1 to a user equipment contention-scheduled for the subchannel-1 in a previous resource assignment step. Likewise, a resource is assigned to a user equipment contention-scheduled for a subchannel-4. This is because a silencing signal is not received from user equipments on the subchannel-1 and the subchannel-4 in the contention result report of a previous resource assignment period.

On the contrary, on subchannel-2, subchannel-3 and subchannel-5, resources are not assigned to user equipments in accordance with a contention result for a previous resource assignment period but given up for a base station having won the contention.

In FIG. 6, CU (contention scheduled user) field indicates an index of a user equipment selected for a next contention. And, CN (contention number) field indicates a contention number which will be used for a next contention.

A contention result report channel is situated ahead of an uplink channel and each femto base station is able to have a dedicated contention result report channel like a control channel. Each user equipment is able to report a contention result of an inter-cell interference link generated by the user equipment itself via a dedicated contention result report channel of a femto base station.

In the following description, various examples of one preferred embodiment of the present invention are explained in detail.

Figure 7:
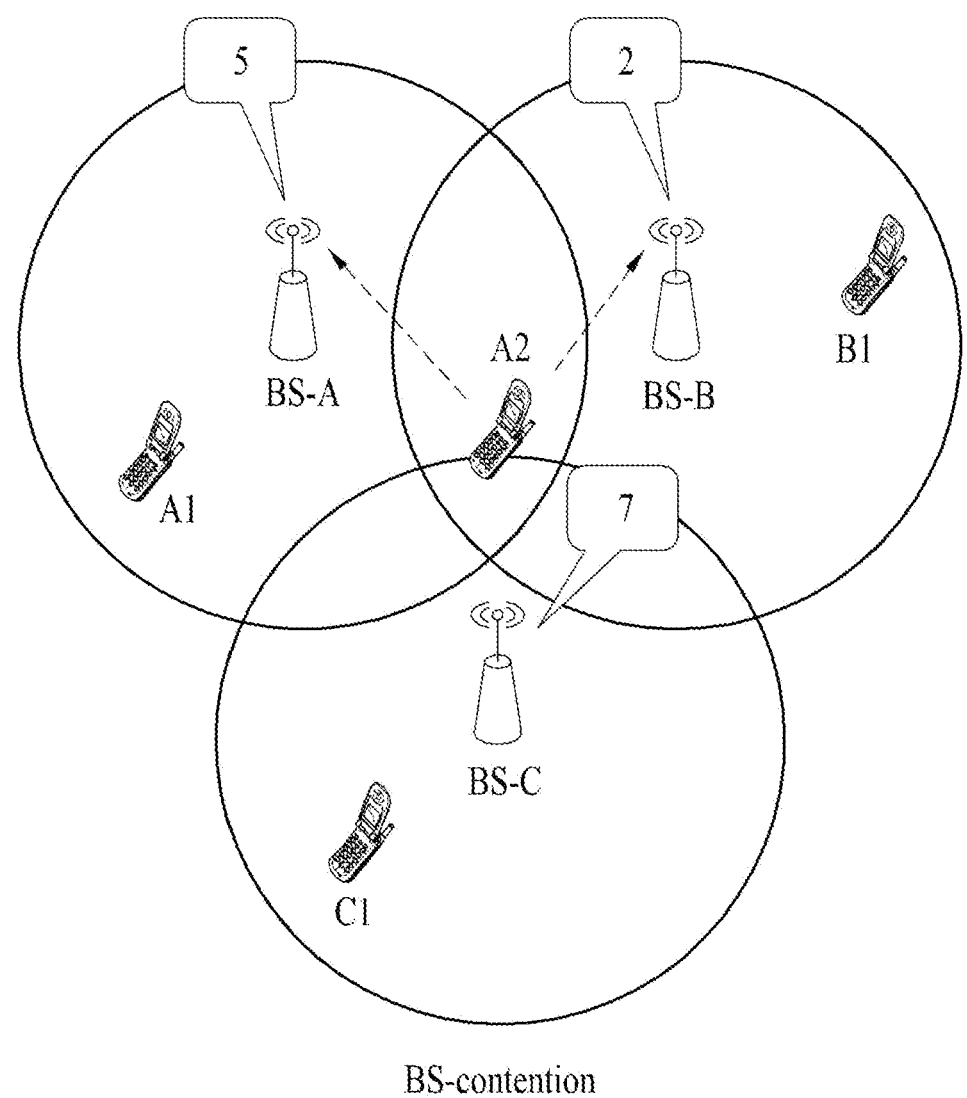
FIG. 7 is a diagram for describing an example of performing a base station contention based scheduling according to one embodiment of the present invention.

FIG. 7 is a diagram for describing an example of performing a base station contention based scheduling according to one embodiment of the present invention.

In the example shown in FIG. 7, assume that a user equipment A2 has a base station B and a base station C contained in a base station list having a potential inter-cell interference link with a base station A to which the user equipment A2 belongs. In case that a real inter-cell interference link based on a contention scheduling on a specific user equipment of each base station is not taken into consideration in addition, the user equipment A2 transmits a silencing signal to the base station A and the base station B except the base station C having transmitted a biggest contention number among the base stations A, B and C, thereby enabling the base station C to use a channel in a corresponding scheduling stage.

FIG. 8 is a diagram for describing an example of performing a contention based scheduling in consideration of a real inter-cell interference link according to one embodiment of the present invention.

Figure 8A:
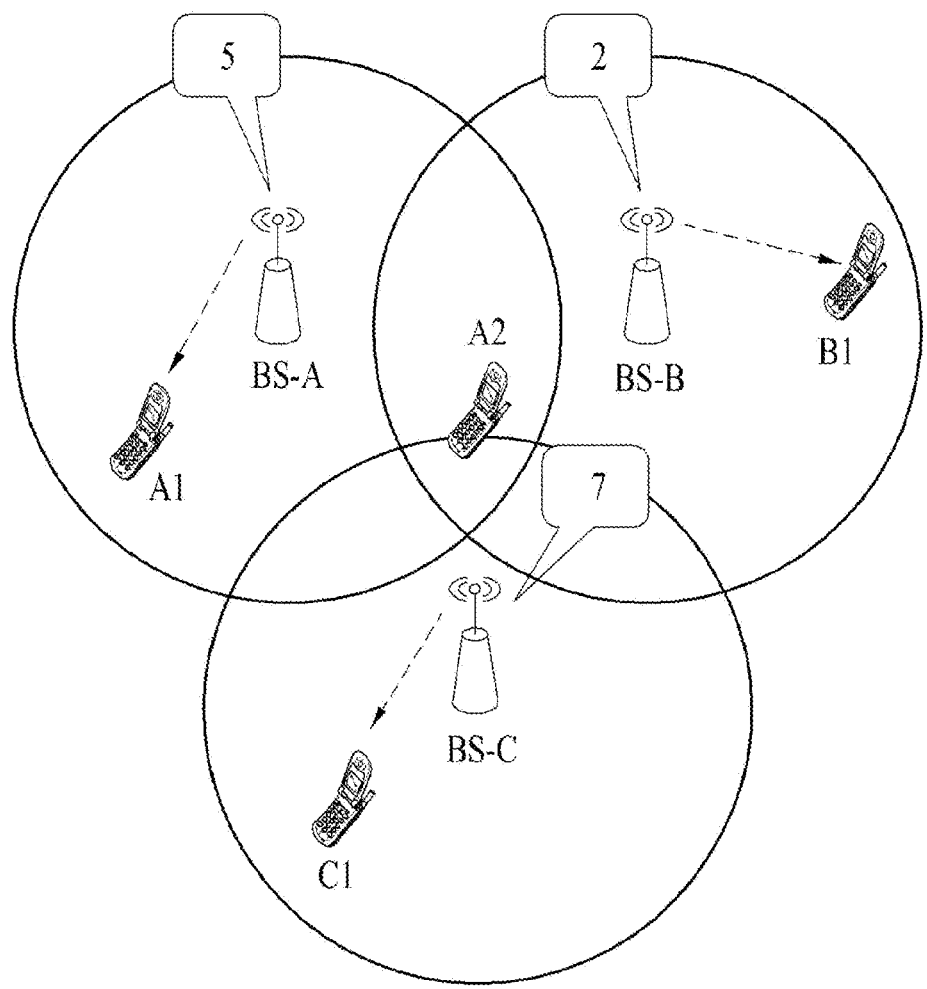
FIG. 8 is a diagram for describing an example of performing a contention based scheduling in consideration of a real inter-cell interference link according to one embodiment of the present invention.
Figure 8B:
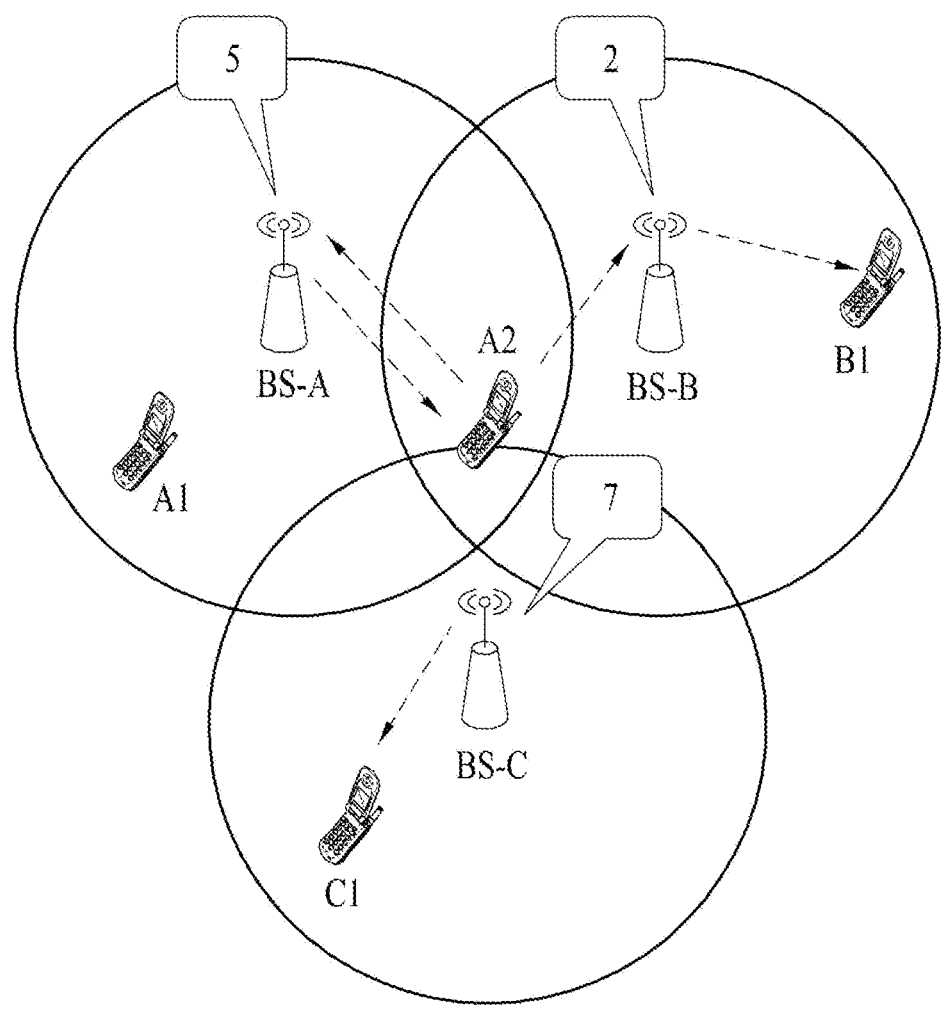

First of all, in FIG. 8A and FIG. 8B, assume that a user equipment A2 has a base station B and a base station C contained in a base station list having a potential inter-cell interference link with a base station A to which the user equipment A2 belongs. Yet, if the user equipment A is not contention-scheduled by any base station, an inter-cell interference link according to the base station list of the user equipment A2 does not become real inter-cell interference link. In this case, each base station is able to use a corresponding scheduling stage freely.

On the other hand, referring to FIG. 8B, if the user equipment A2 receives a contention scheduling from the base station A, an inter-cell interference link according to the base station list stored by the user equipment A2 becomes a real inter-cell interference link. Therefore, the user equipment A2 is able to transmit a silencing signal to the base station A and the base station B except the base station C having transmitted a biggest contention number in a corresponding scheduling stage.

In the following description, a base station list managed by each user equipment is explained in detail. For this, a following system model is defined.

First of all, a set of base stations on a network is expressed as 'N' and a set of user equipments connected to each base station n is expressed as Kn. SINR of a signal, which is received on a subchannel m during a slot t by a user equipment k connected to each Kn, can be represented as follows.

$$SINR_{n,k}^m(t) = \frac{g_{n,k}^m(t)p_n^m(t)I_{n,k}^m(t)}{\sum_{a \neq n} g_{a,k}^m(t)p_a^m(t)I_a^m(t) + N_0^m} \quad \text{[Formula 1]}$$

In Formula 1, $g_{n,k}^m$ and $p_n^m$ indicates a channel gain between a base station n and a user equipment k on each subchannel m and a transmission power of the base station nm, respectively. $I_{n,k}^m(t)$ indicates an assignment indicator. If a base station n assigns a subchannel m to a user equipment k for a slot t, $I_{n,k}^m(t)$ is set to 1. Otherwise, $I_{n,k}^m(t)$ is set to 0. And, an instantly available data rate determined for $p_n^m$ and $I_{n,k}^m(t)$ is given as follows.

$$R_{n,k}^m(t) = W^m \log_2(1 + SINR_{n,k}^m(t)) \quad \text{[Formula 2]}$$

In Formula 2, $W^m$ is a bandwidth of a subchannel m. For clarity of the following description of the present embodiment, assume that $g_{n,k}^m$ and $N_0^m$ are constant for all subchannels. Thus, the object of the present invention is to design a medium access scheme of determining $I_{n,k}^m(t)$ by each base station distributively to maximizing spatial reuse of frequency by guaranteeing SINR thresholds of user equipments during each resource assignment period.

In particular, one preferred embodiment of the present invention proposes that the number of base stations contained in an interferential base station list is determined in a following manner to guarantee an expected processing rate. An expected value for a processing rate can be represented as follows.

$$E[R_{n,k}(t)] = \lim_{T\to\infty} \frac{1}{T} \sum_{t=1}^{T} W\log_2(1 + SINR_{n,k}(t)) \quad \text{[Formula 3]}$$

$$= \lim_{T\to\infty} \frac{1}{T} \sum_{t=1}^{T} W\log_2 \left(1 + \frac{g_{n,k}(t)p_n(t)I_{n,k}(t)}{\sigma^2 + \sum_{a\in A} g_{a,k}(t)p_a(t)I_a(t)}\right)$$

And, Formula 3 can be simplified as follows.

$$E[R_{n,k}(t)] = \lim_{T\to\infty} \frac{1}{T} \sum_{t=1}^{T} W\log_2(1 + SINR_{n,k}(t)) \quad \text{[Formula 4]}$$

$$= E\left[W\log_2\left(1 + \frac{g_{n,k}p_n}{\sigma^2 + \sum_{a\in A, a\notin L_{n,k}} g_{a,k}p_a I_a(t)}\right)\right]$$

$$Pr[CU = k]Pr[RU = k|CU = k]$$

$$\geq W\log_2\left(1 + \frac{g_{n,k}p_n}{\sigma^2 + \sum_{a\in A, a\notin L_{n,k}} g_{a,k}p_a}\right)_*$$

Pr[CU=k] Pr[no loser-signal from internal user and from external user]

In Formula 4, $$\frac{g_{n,k}p_n}{\sigma^2 + \sum_{a\in A, a\notin L_{n,k}} g_{a,k}p_a}$$

indicates a guaranteed SINR value and Pr[CU=k] will become a term that depends on a scheduling policy. The present embodiment proposes that the number of base stations in the interferential base station list is managed according to Formula 4.

In brief, according to one preferred embodiment of the present invention, the number of base stations in an interferential base station list is determined per user equipment to enable a guaranteed SINR or an expected processing rate to have a value over a predetermined level in aspect of each user equipment. And, the interferential base station list is managed in a manner that the base stations amounting to the determined number among neighbor base stations are included in the interferential base station list in order of a large interference quantity.

Figure 9:
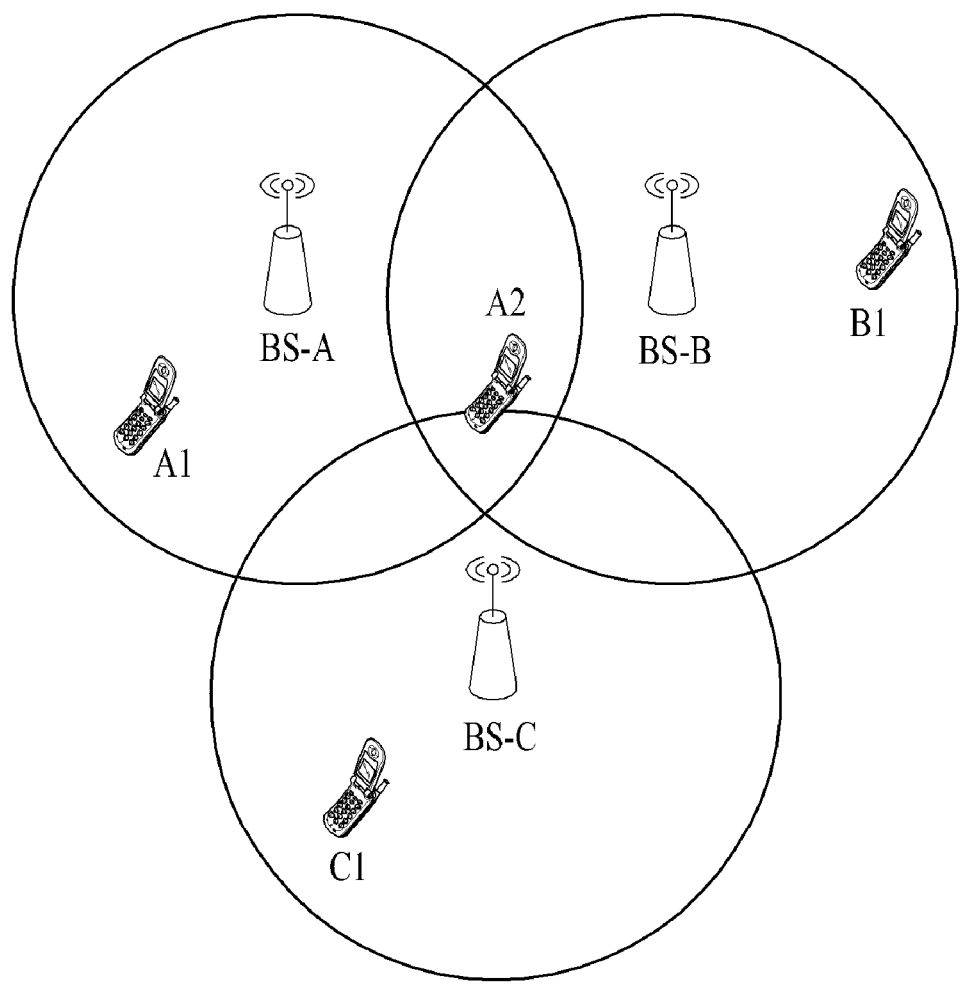
FIG. 9 is a diagram for an example of describing a method of managing an interference base station list per user equipment according to one embodiment of the present invention.
Figure 10:
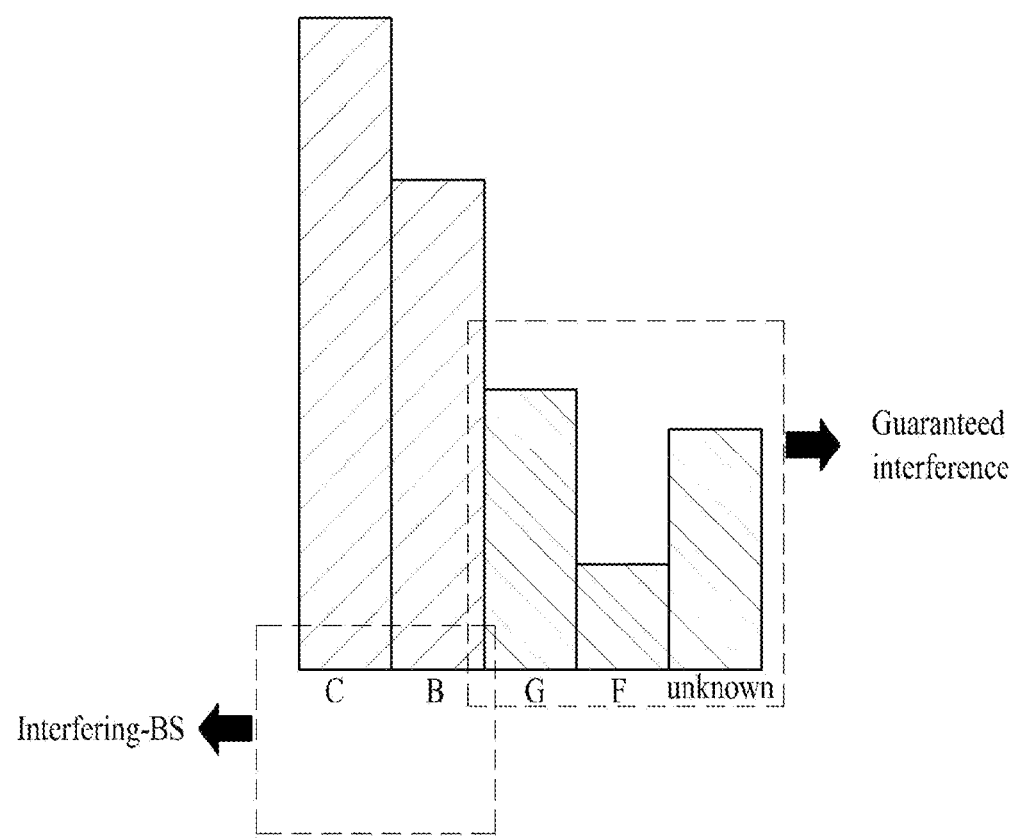
FIG. 10 is a diagram for an example of a base station list management in accordance with an interference level measured in viewpoint of a user equipment A2 in the example shown in FIG. 9.

FIG. 9 and FIG. 10 are diagrams for an example of describing a method of managing an interference base station list per user equipment according to one embodiment of the present invention.

Referring to FIG. 9, in a system having base stations deployed, assume that the number of base stations, of which expected processing rate is determined to have a value over a predetermined level, is 3 (e.g., 2 base stations except a base station A that is a serving base station) in viewpoint of a user equipment A2, as mentioned in the above description. And, assume a case that an interference quantity per base station is as follows.

TABLE 1

| BS | RX-power |
|---|---|
| C | 0.5 mW |
| B | 0.3 mW |
| G | 0.12 mW |
| F | 0.05 mW |
| Unknown | 0.1 mW |

For example shown in FIG. 9, a user equipment A2 should manage 2 base stations using an interferential base station list. If an interference quantity measured in viewpoint of the user equipment A2 follows Table 1, the user equipment A2 enables a base station B and a base station C to be included in the interferential base station list as interferential base stations having inter-cell interference links with a base station A to which the user equipment A2 belongs. And, FIG. 10 shows an example of a neighbor base station list management in accordance with an interference quantity measured in viewpoint of the user equipment A2. In aspect of the user equipment A2, the interference from base stations G, F and the like can be determined as a prescribed level of interference bearable in obtaining an expected processing rate.

According to the above-described embodiment, a base station list managed by each user equipment uses a neighbor base station list failing to contain a base station to which the corresponding user equipment does not belong. Yet, according to another embodiment, a base station list managed by each user equipment can be set to contain all base stations having a potential inter-cell interference link relation as well as a base station to which the corresponding user equipment belongs.

Meanwhile, according to the above-described embodiment, unlike the case according to a simple geographical coverage, it is able to adjust the number of interferential base stations in a neighbor base station list managed by a user equipment in consideration of an expected processing rate.

For instance, in case that the number of base stations in a base station list managed by a user equipment A2 in the example shown in FIG. 9 is changed into 2 (i.e., 1 base station except the base station A that is a serving base station), only the base station C in the above-described example can be selected as a base station having an inter-cell interference link with the base station A as follows.

TABLE 2

| BS | RX-power |
|---|---|
| C | 0.5 mW |
| B | 0.3 mW |
| G | 0.12 mW |
| F | 0.05 mW |
| Unknown | 0.1 mW |

Thus, if a neighbor base station list managed by a user equipment A2 is updated, an adaptive silencing concept according to one embodiment of the present invention is described as follows.

Figure 11:
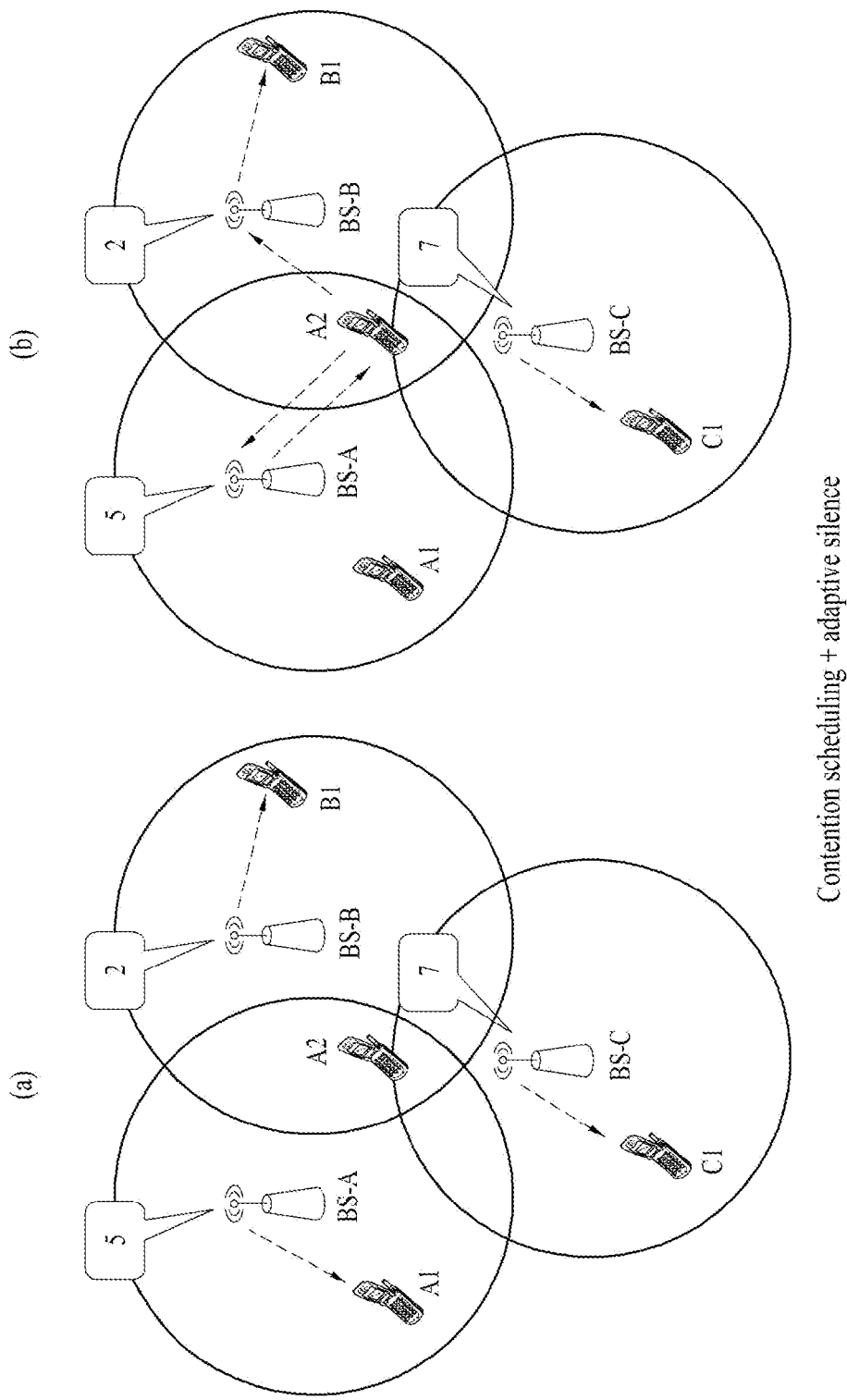
FIG. 11 is a diagram for describing a concept of adaptive silencing according to one embodiment of the present invention.

FIG. 11 is a diagram for describing a concept of adaptive silencing according to one embodiment of the present invention.

FIG. 11 (a) shows the same situation described with reference to FIG. 8A. In particular, unless base stations A, B and C doe not perform a contention scheduling on a user equipment A2, real inter-cell interference links are not established among the base stations A, B and C. Therefore, the base stations A, B and C are able to use a corresponding scheduling state freely.

On the other hand, FIG. 11 (b) shows a situation corresponding to the former description with reference to FIG. 8B. Yet, when an adaptive silencing according to one embodiment of the present invention is applied, if such a base station C, to which a user equipment A2 does not belong, wins a contention among base stations A, B and C, the user equipment A2 transmits a silencing signal to the base station A only.

On the contrary, when an adaptive silencing according to the present embodiment is applied, if a base station A, to which a user equipment A2 belongs, wins a contention, the user equipment A2 transmits a silencing signal to all base stations in a neighbor base station list.

According to one embodiment of the present invention, proposed is to apply an opportunistic reuse scheme to raise a frequency reuse rate in addition to the above-mentioned contention based scheduling scheme in consideration of (real) inter-cell interference link.

Figure 12:
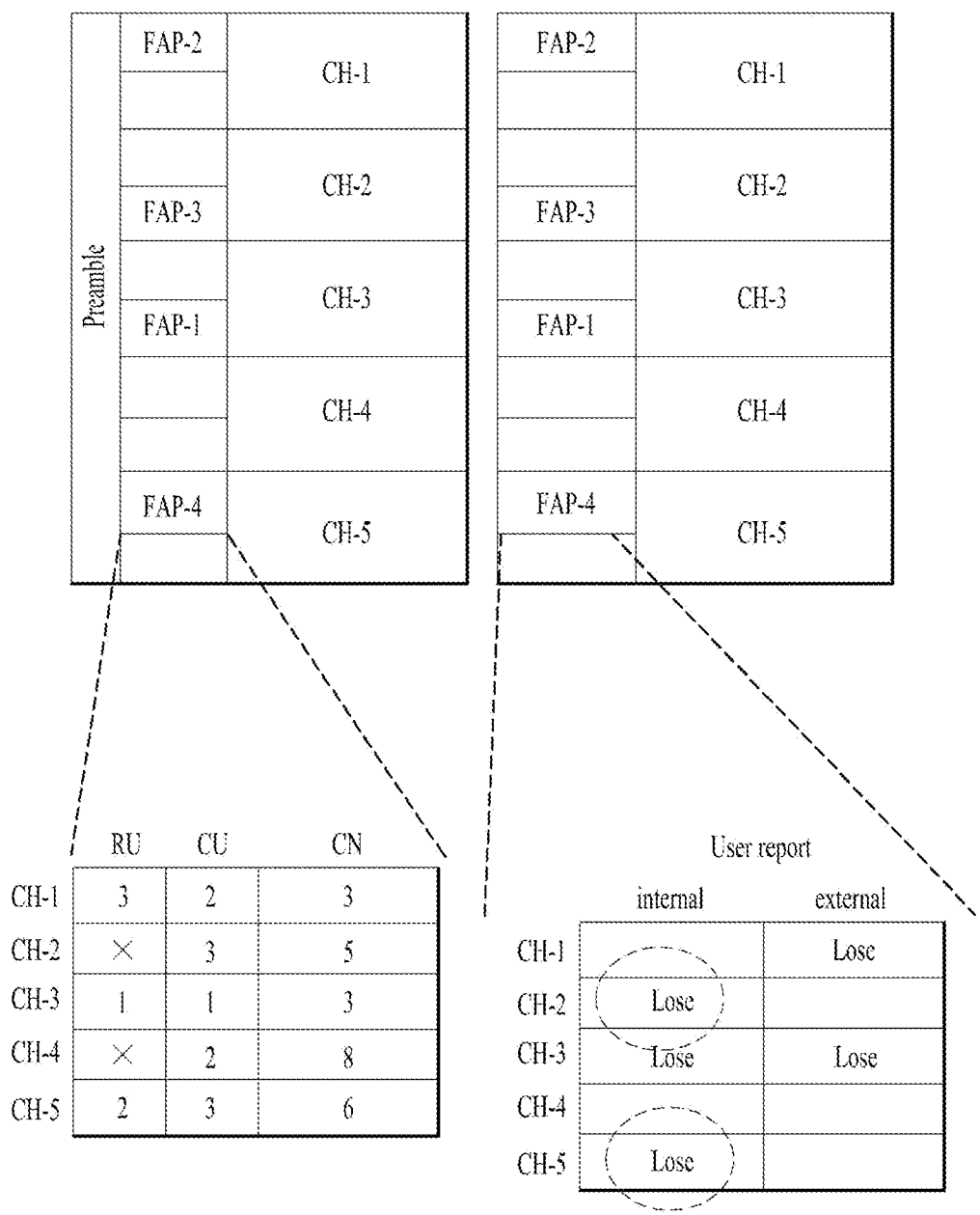
FIG. 12 is a diagram for one example of a frame structure for supporting an opportunistic reuse scheme according to one embodiment of the present invention.

FIG. 12 is a diagram for one example of a frame structure for supporting an opportunistic reuse scheme according to one embodiment of the present invention.

First of all, an opportunistic reuse scheme according to one embodiment of the present invention has the following meaning. First of all, a base station determines whether a user equipment (hereinafter abbreviated UE) having transmitted a silencing signal is a UE belonging to the corresponding base station (i.e., an internal UE) or a UE not belonging to the corresponding base station (i.e., an external UE). In case of receiving a silencing signal from the UE not belonging to the corresponding base station, the corresponding base station does not perform a resource assignment on a corresponding subchannel. Yet, if a silencing signal is received from the UE belonging to the corresponding base station, the corresponding reception is attributed to an inter-cell interference link formed according to a base station list managed by the UE having transmitted the silencing signal. Therefore, the corresponding base station is able to assign a corresponding subchannel to another UE belonging to the corresponding base station. For this, a frame structure needs to be able to discern whether a UE transmitting a silencing signal in a UL interval is an internal UE or an external UE. And, the frame structure also needs to specify that a resource assignment of each subchannel is a resource assignment to a prescribed UE.

The frame structure shown in FIG. 12 can include RU (resource assigned user) field, CU (contention user) field and CN (contention number) filed in DL interval. The CU field and the CN field are identical to those shown in FIG. 6. And, the RU field indicates a field for specifying a user equipment, to which a corresponding subchannel resource is assigned, in addition. In FIG. 12, subchannel 1 is assigned to a user equipment 3, subchannel 3 is assigned to a user equipment 1, and subchannel 5 is assigned to a user equipment 2. Yet, resource assignment is not performed on subchannels 2 and 4.

Meanwhile, in the frame structure shown in FIG. 12, regarding a UL interval, a report interval by an external user and a report interval by an internal user are separately formed in a user report interval. In this example, situations on subchannel 1 and subchannel 2 are described in detail as follows.

FIG. 13 is a diagram for an example of describing the opportunistic reuse scheme according to the former example shown in FIG. 12.

Figure 13A:
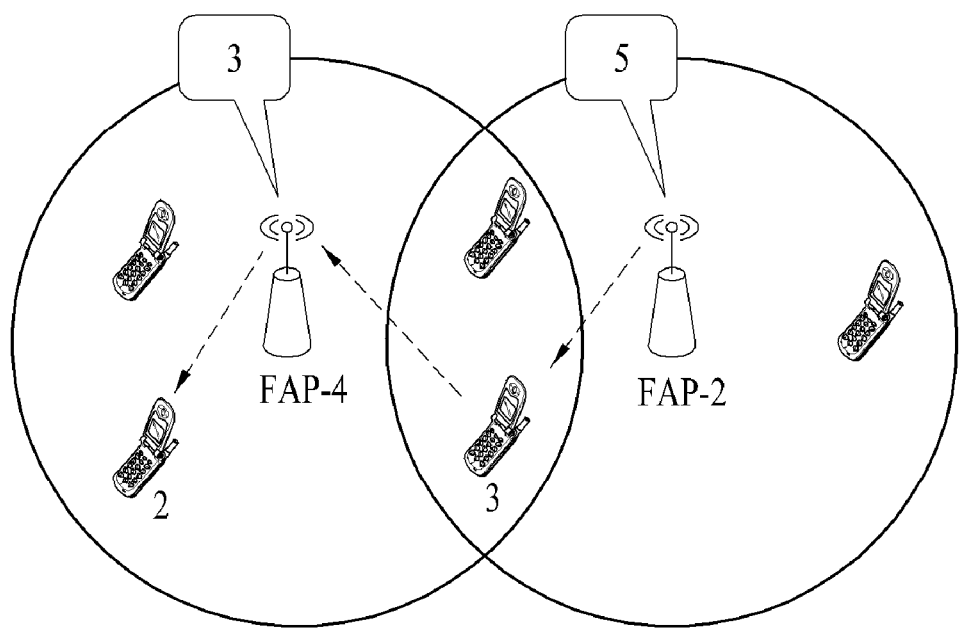
FIG. 13 is a diagram for an example of describing the opportunistic reuse scheme according to the former example shown in FIG. 12.

Referring to FIG. 13A, like the subchannel 1 shown in FIG. 12, a base station 4 (FAP-4) performs a contention scheduling on a user equipment 2 and then transmits a contention number 3. And, the base station 4 (FAP-4) receives a silencing signal (or a lose signal) from a user equipment 3 (i.e., an external UE) not belonging to the base station 4 (FAP-4). In this case, the base station 4 (FAP-4) does not perform a resource assignment on other user equipments as well as the user equipment 2 in a corresponding scheduling stage.

Figure 13B:
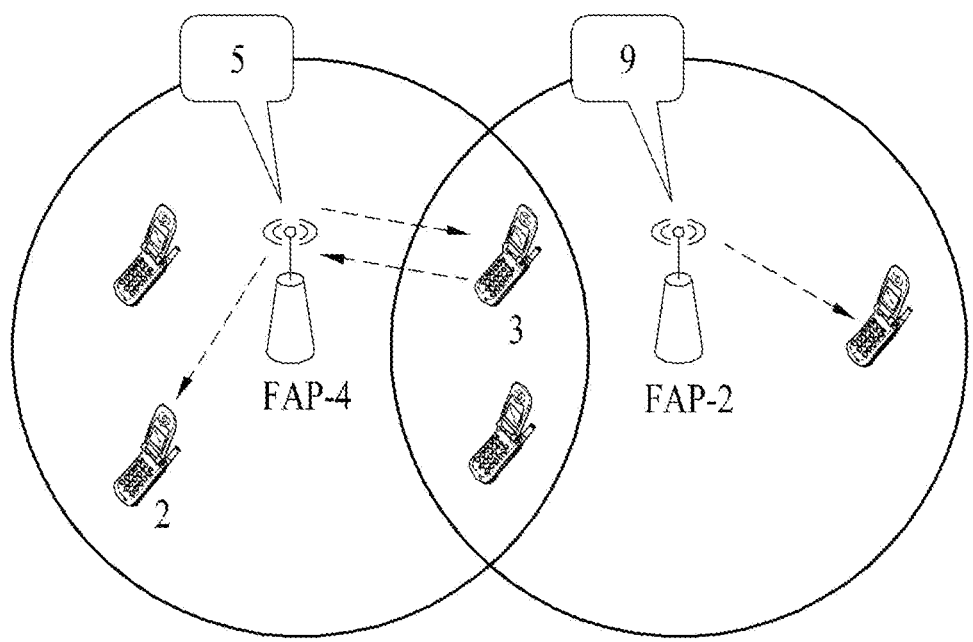

On the contrary, referring to FIG. 13B, like the subchannel 2 shown in FIG. 12, a base station 4 (FAP-4) performs a contention scheduling on a user equipment 3 and then transmits a contention number 5. And, the base station 4 (FAP-4) receives a silencing signal from the user equipment 3 (i.e., an internal UE) belonging to the base station 4 (FAP-4). According to the present embodiment, the base station 4 (FAP-4) regards the corresponding silencing signal as becoming a problem by a base station list managed by the user equipment 3 only. Despite receiving the silencing signal from the user equipment 3, it is proposed to perform a resource assignment to another user equipment (e.g., user equipment 2). Using the opportunistic reuse scheme, a frequency reuse rate can be additionally raised by maintaining the same level of processing rate requirements.

In the following description, a method of applying the above-mentioned scheduling scheme to a conventional system is explained.

First of all, in 3GPP LTE (long term evolution) system, DL system bandwidth, PHICH structure and SFN information (16 bits) are contained in MIB (master information block) and are then transmitted on PBCH (physical broadcast channel) stably decodable on a cell edge together with 10 spare bits. According to one embodiment of the present invention, in order to deliver contention information as reliable as possible without creating a separate contention control channel for a contention, proposed is to use the above-described PBCH. Each base station is able to transmit RA information (1 bit), CU information (3 bits or less) and CN information (3 bits or less) using a portion of the 10 bits of the MIB. A user equipment extracts contention information by decoding PBCH of each scrambled base station using PCI (physical cell ID) of its base station and neighboring interferential base stations, and then reports a simple contention result via PRACH (physical random access channel). Therefore, the user equipment is able to operate by the 2-step scheduling scheme according to embodiments of the present invention mentioned in the foregoing description.

In the following description, a simulation test result for checking performance of the above-mentioned embodiment is introduced.

First of all, parameters used for the simulation test are set in consideration of 3GPP LTE system and their values are represented in Table 3.

TABLE 3

| System bandwidth | 20 MHz |
| Transmit power | 20 dBm |
| Lognormal shadowing | 10 dB |
| Penetration loss | 20 dB |

TABLE 3-continued

| | |
|---|---|
| Noise power density | −174 dBm/Hz |
| Pathloss | L = 127 + 30 log$_{10}$R<br>R in [km] |
| Number of subchannels | 5 (4 MHz/subchannel) |
| Cell radius | 30 m |

The simulation test is performed in a manner of changing the number of femto base stations up to 100 from 10 in a range of 500 m×500 m. And, 100 simulation tests are performed in a manner of randomly arranging locations of femto base stations to cope with various situations. Moreover, the present simulation test considers CSG (closed subscriber group) femto cell environment. In particular, as CSG environment, assume a following situation. First of all, each femto base station randomly has 1 to 5 user equipments in a range of 30 m. Secondly, 3 user equipments are connected to 1 femto base station on the average.

Figure 14:
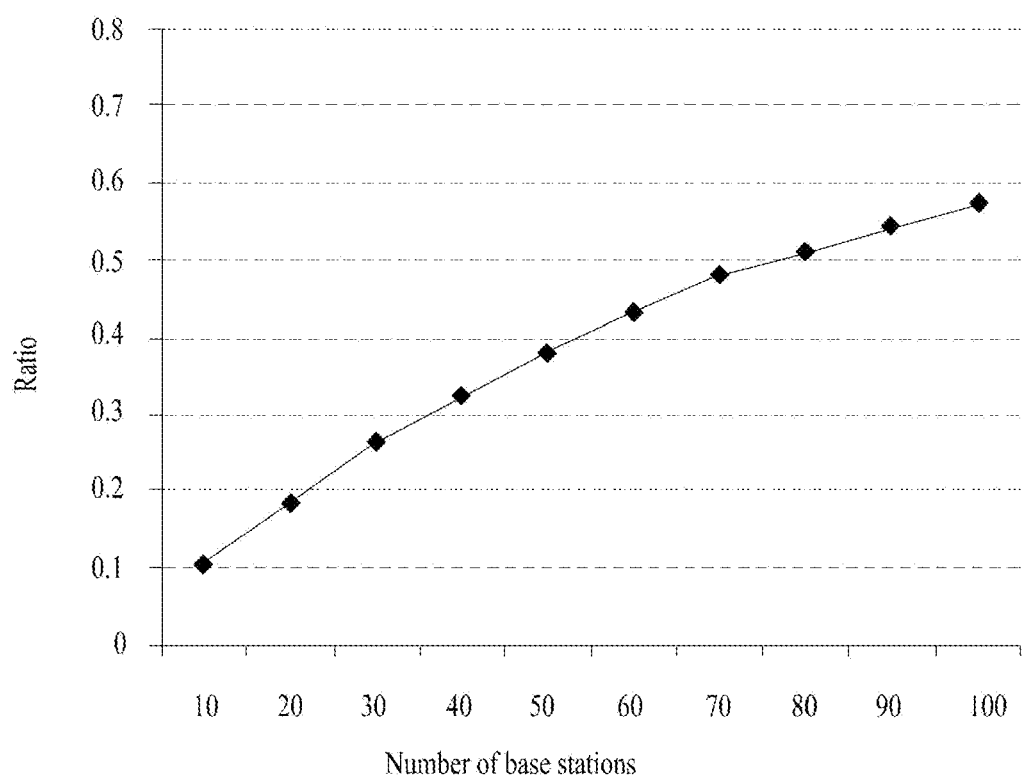
FIG. 14 is a graph of a ratio of the number of inter-cell interference exposed user equipments to the number of total user equipments on the average in the topology given according to a femto base station.

FIG. 14 shows a ratio of the number of inter-cell interference exposed user equipments to the number of total user equipments on the average in the topology given according to a femto base station. Referring to FIG. 14, it can be observed that user equipments in the CSG environment are more frequently exposed to inter-cell interference than those in the OSCG environment in which a base station is selected based on a reception power. For fair comparison, a resource assignment of each base station is assumed as following Round-Robin Policy. Hence, assume that a user equipment belonging to each base station has an opportunity to use a channel equally (or an opportunity to try a channel use).

In the present simulation test result, as mentioned in the foregoing description, a contention based scheduling scheme in consideration of a real inter-cell interference link proposed according to embodiments of the present invention is expressed as DDIA distributed dynamic ICI avoidance) and is compared to a scheme having a frequency reuse rate set to 1 (Reuse=1) of a base station contention based (BS-contention) scheme in performance.

Figure 15:
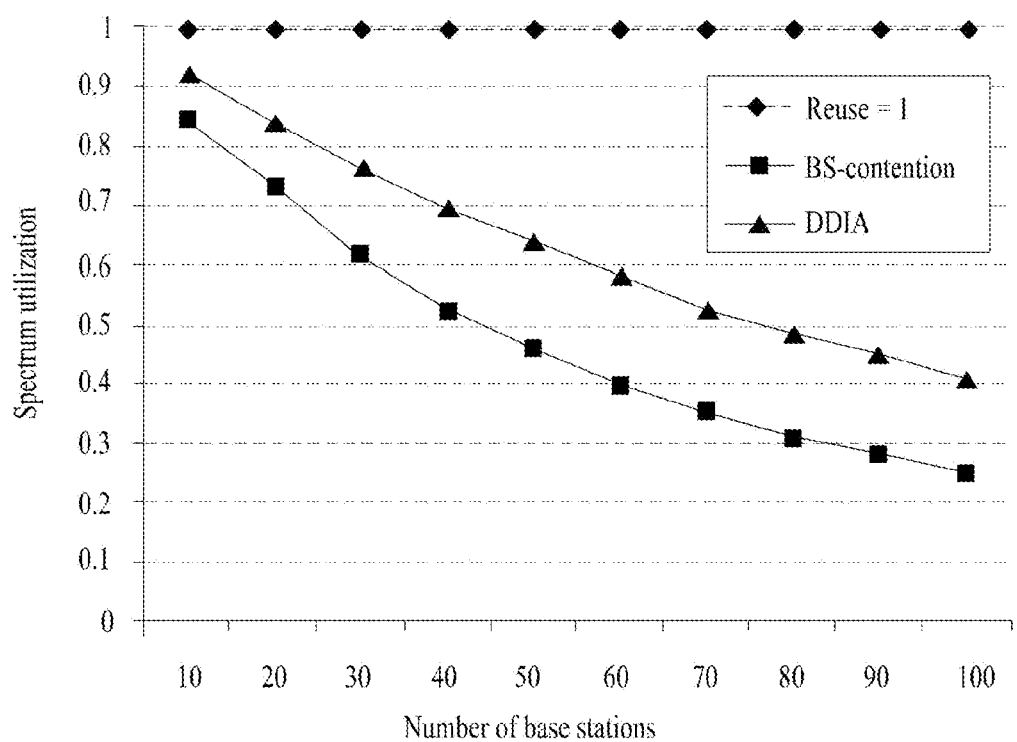
FIGS. 15 to 17 are graphs for comparing performance of a scheme according to one embodiment of the present invention to those of other schemes as a result of simulation tests, respectively.
Figure 16:
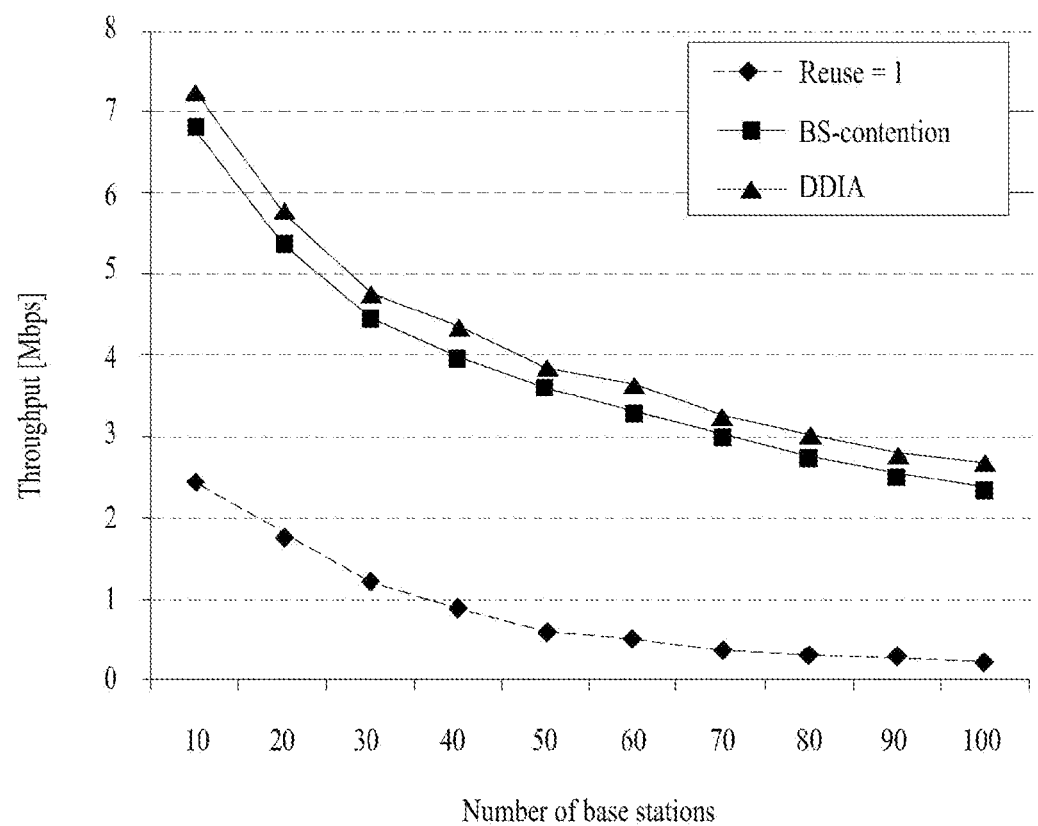
Figure 17:
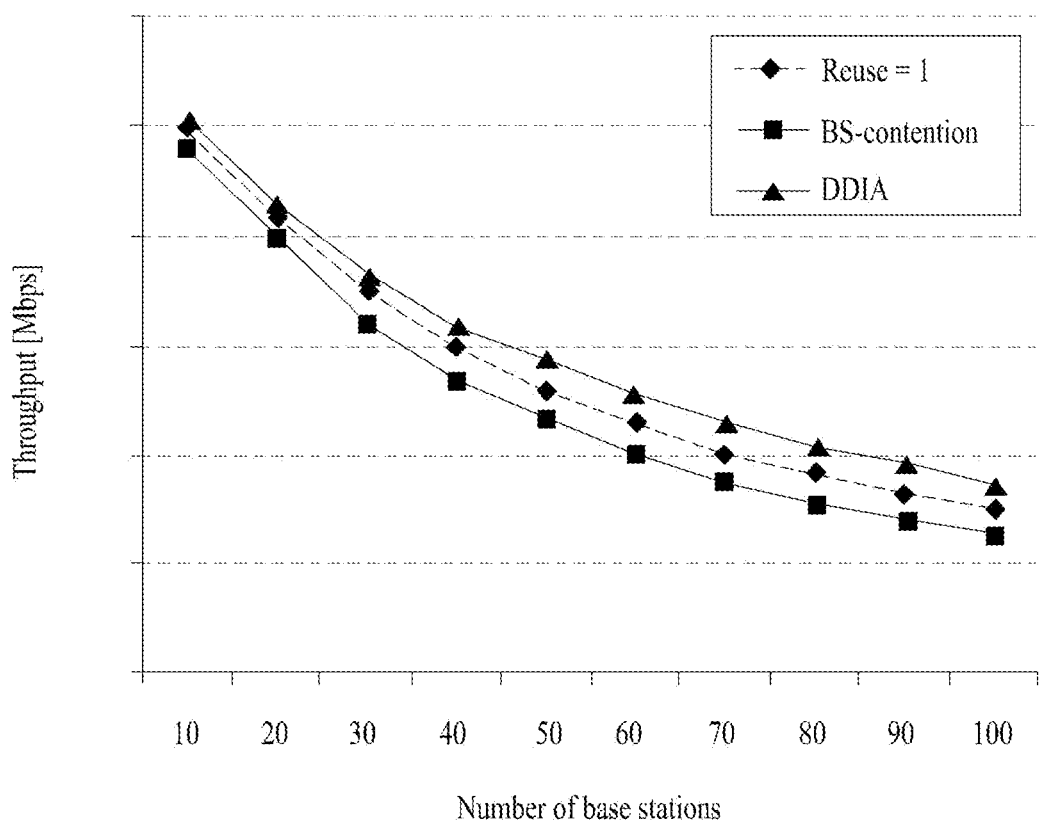

FIGS. 15 to 17 are graphs for comparing performance of a scheme according to one embodiment of the present invention to those of other schemes as a result of simulation tests, respectively.

In particular, FIG. 15 shows frequency use rates for three kinds of schemes in consideration, respectively. FIG. 16 shows an average transmission rate of user equipments exposed to inter-cell interference. And, FIG. 17 shows an averaged total network capacity.

Referring to FIG. 15, compared to a base station contention scheme, a DDIA scheme according to embodiments of the present invention has a higher frequency use rate. And, it can be observed that the increase of the frequency use rate is attributed to a contention of base stations based on a real inter-cell interference link. In particular, a user equipment sets up an inter-cell interference link only if it is contention-scheduled. Therefore, the number of total contentions is lowered in probability and spatial reusability of frequency is enhanced. As the density of network increases, the frequency reuse rate is lowered. This is because the case of giving up a channel occurs frequently after a contention in accordance of an increasing ratio of user equipments, which are exposed to inter-cell interference, to total user equipments.

Referring to FIG. 16, as a high SINR is guaranteed, a data rate of user equipments exposed to inter-cell interference in a scheme proposed according to embodiments of the present invention is improved more than that of a frequency reuse rate 1 scheme (i.e., a scheme having no cooperation for inter-cell interference avoidance). Moreover, in case of the frequency reuse rate 1 scheme, a considerable number of user equipments are unable to receive data at all due to a very strong interference signal.

Referring to FIG. 17, as a density of femto base stations increases, it can be observed that a scheme proposed according to embodiments of the present invention improves a network capacity further than an average network capacity. Compared to the frequency reuse rate 1 resource assignment, despite that a frequency use rate is lowered for inter-base station cooperation, as a high SINR is guaranteed for user equipments, it can be observed that a network capacity is increased. Moreover, if each femto base station assigns a channel resource in consideration of a data rate requested by a user equipment or fairness of a data rate instead of assigning a channel resource to user equipments belonging to the corresponding femto base station (i.e., Round-Robin Policy), most of the channel resource in the frequency reuse rate 1 will be assigned to user equipments having a low SINR. Therefore, it is able to expect that a performance difference from a scheme proposed according to embodiments of the present invention will further increase. In this case, a network capacity difference between the proposed scheme and the base station contention based scheme depends on a difference in frequency use rate.

The improvement of the frequency use rate in FIG. 15 is slightly smaller than that in FIG. 17 due to the following reason. Namely, even if an inter-cell interference exceeding an interference threshold is avoided, as a spatial reuse of frequency increases, interference from base stations failing to be connected via inter-cell interference links increases.

Thus, through the simulation test result, a scheme proposed according to embodiments of the present invention considerably enhances performance of a user equipment exposed to inter-cell interference as well as improves overall network capacity in an environment in which base stations are intensively distributed.

In the following description, a device of a base station or a user equipment, which performs signal transmission and reception based on performing a contention based scheduling according to the above-described embodiments, is explained.

Figure 18:
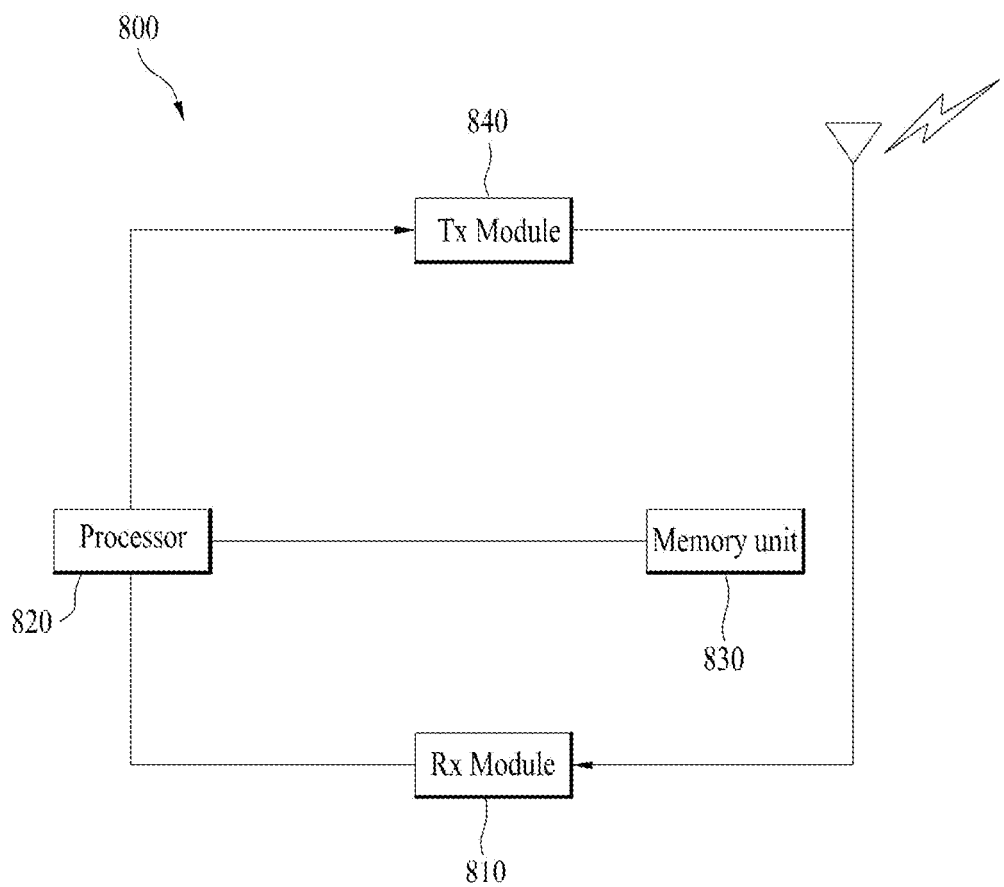
FIG. 18 is a diagram for configuration of a base station or user equipment device according to another embodiment of the present invention.

FIG. 18 is a diagram for configuration of a base station or user equipment device according to another embodiment of the present invention.

Referring to FIG. 18, a base station or user equipment device 800 according to one embodiment of the present invention includes a transmitting module 840, a receiving module 810 and a processor 820. Moreover, the user equipment device 800 according to one embodiment of the present invention is able to further include a memory 830 configured temporarily store a contention number information, an interferential base station list information and the like. The transmitting module 840 and the receiving module 810 are used for signal transmission and reception between a base station and a user equipment.

In case that the device 800 shown in FIG. 18 is the base station, the transmitting module 840 can be set to transmit a first step scheduling signal containing a user equipment specifying information for specifying a user equipment and a contention number information and a second step scheduling signal containing a resource assignment information on a UL signal reception or a DL signal transmission to a specific user equipment. And, the receiving module 810 can be configured to receive a silencing signal for requesting not to perform a resource assignment in a corresponding scheduling stage from at least one or more user equipments including the specific user equipment.

The processor 820 can be configured to control the second step scheduling signal transmission of the transmitting module 840 in consideration of whether the receiving module 810 receives the silencing signal from the at least one or more user equipments including the specific user equipment.

Meanwhile, in case that the device 800 shown in FIG. 18 is the user equipment, the receiving module 810 can be configured to receive a first step scheduling signal containing a user equipment specifying information and a contention number information and a second step scheduling signal containing a resource allocation information on a UL signal transmission or a DL signal reception from at least one base station. And, the transmitting module 840 can be configured to transmit a silencing signal for requesting not to perform a resource assignment in a corresponding scheduling stage to a specific base station.

If the user equipment specifying information of the first step scheduling signal includes the user equipment, the processor 810 can be configured to control the receiving module and the transmitting module to transmit the silencing signal to one of the base stations contained in a base station list except a base station having transmitted a contention number information having a highest priority among the base stations, each having an inter-cell interference link that applies interference over a predetermined level to the user equipment for a prescribed period.

And, the user equipment 800 can further include the memory 830 configured to store the list of the base stations having the inter-cell interference links.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

Accordingly, the embodiments of the present invention in the foregoing description are applicable to various mobile communication systems available for such a small-scale base station as a femto base station and the like in the same manner as well as 3GPP LTE system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting and receiving signals at a user equipment considering an inter-cell interference link formed in accordance with a dynamic scheduling in a mobile communication system, the method comprising:
   receiving a first step scheduling signal including contention number information by the user equipment from base stations in a base station list managed by the user equipment considering the inter-cell interference link;
   transmitting a silencing signal by the user equipment for requesting not to perform a resource assignment in a corresponding scheduling stage to one or more base stations except a first base station having transmitted the contention number information having a highest priority among the base stations in the base station list, wherein transmitting the silencing signal comprises:
   if the first base station is a second base station having the user equipment belong thereto, transmitting the silencing signal to all the base stations in the base station list except the base station having the user equipment belong thereto; and
   if the base station having transmitted the contention number information having the highest priority among the base station having the user equipment belong thereto and the base stations in the base station list is not the base station having the user equipment belong thereto, transmitting the silencing signal to the base station having the user equipment belong thereto only; and
   receiving a second step scheduling signal including resource assignment information on an uplink signal transmission or a downlink signal reception by the user equipment from the first base station.

2. The method of claim 1, wherein the first step scheduling signal further includes user equipment specifying information, and
   wherein if the user equipment specifying information in the first step scheduling signal does not indicate the user equipment, the user equipment does not transmit the silencing signal.

3. The method of claim 2, wherein the mobile communication system uses a frame including a downlink interval including downlink scheduling information containing the user equipment specific information and the contention number information in $(n+1)^{th}$ scheduling stage and the resource assignment information in $n^{th}$ scheduling stage and an uplink interval including the silencing signal for a specific base station in the $(n+1)^{th}$ scheduling stage.

4. The method of claim 1, wherein the user equipment updates the base station list in accordance with a SINR threshold reference or a processing rate of an uplink or downlink signal of the user equipment by a prescribed cycle unit.

5. The method of claim 4, wherein the user equipment manages in the base station list to include the base stations causing inter-cell interference to the user equipment, and
   wherein a number of the base stations in the base station list is determined to guarantee a performance threshold of the user equipment.

6. The method of claim 1, wherein the at least one base station includes a femto base station.

7. A user equipment, which transmits and receives signals by considering an inter-cell interference link formed in accordance with a dynamic scheduling in a mobile communication system, comprising:
   a receiving module receiving a first step scheduling signal including contention number information and a second step scheduling signal including resource assignment information on an uplink signal transmission or a downlink signal reception;
   a transmitting module transmitting a silencing signal for requesting not to perform a resource assignment in a corresponding scheduling stage, wherein transmitting the silencing signal comprising:

if the first base station is a second base station having the user equipment belong thereto, transmitting the silencing signal to all the base stations in the base station list except the base station having the user equipment belong thereto; and if the base station having transmitted the contention number information having the highest priority among the base station having the user equipment belong thereto and the base stations in the base station list is not the base station having the user equipment belong thereto, transmitting the silencing signal to the base station having the user equipment belong thereto only; and a processor controlling the receiving module and the transmitting module to transmit the silencing signal to one or more base stations except a first base station having transmitted the contention number information having a highest priority among base stations in a base station list managed by the user equipment considering the inter-cell interference link.

8. The user equipment of claim 7, wherein the first step scheduling signal further includes user equipment specifying information and wherein if the user equipment specifying information in the first step scheduling signal does not indicate the user equipment, the processor controls the user equipment not to transmit the silencing signal.

9. The user equipment of claim 8, wherein the mobile communication system uses a frame including a downlink interval including downlink scheduling information containing the user equipment specific information and the contention number information in $(n+1)^{th}$ scheduling stage and the resource assignment information in $n^{th}$ scheduling stage and an uplink interval including the silencing signal for a specific base station in the $(n+1)^{th}$ scheduling stage.

10. The user equipment of claim 7, further comprising a memory configured to store the base station list including the base station causing inter-cell interference to the user equipment, and wherein the processor updates the base station list in accordance with an SINR threshold reference or a processing rate of an uplink or downlink signal of the user equipment by a prescribed cycle unit.

11. The user equipment of claim 10, wherein the processor manages a number of the base stations in the base station list to guarantee a performance threshold of the user equipment.

12. The user equipment of claim 10, wherein the at least one base station includes a femto base station.

* * * * *